United States Patent
Stercho

(10) Patent No.: US 6,719,944 B2
(45) Date of Patent: Apr. 13, 2004

(54) METHOD AND APPARATUS FOR DESLAGGING AND TAPPING AN INTEGRATED ELECTRIC STEEL MAKING FURNACE

(75) Inventor: Michael J. Stercho, Wexford, PA (US)

(73) Assignee: SMS Demag, Inc., Pittsburgh, PA (US)

( * ) Notice: Subject to any disclaimer, the term of this patent is extended or adjusted under 35 U.S.C. 154(b) by 0 days.

(21) Appl. No.: 10/122,030

(22) Filed: Apr. 15, 2002

(65) Prior Publication Data

US 2002/0110175 A1 Aug. 15, 2002

Related U.S. Application Data

(63) Continuation-in-part of application No. 09/738,095, filed on Dec. 16, 2000, now Pat. No. 6,521,170.

(51) Int. Cl.⁷ .................................................. F27D 3/00
(52) U.S. Cl. .................... 266/44; 266/142; 266/DIG. 1; 373/79
(58) Field of Search ..................... 266/44, 142, DIG. 2; 373/78, 72, 79

(56) References Cited

U.S. PATENT DOCUMENTS

| | | | | |
|---|---|---|---|---|
| 1,348,319 A | * | 8/1920 | Reilly et al. ................. | 266/165 |
| 3,807,944 A | * | 4/1974 | Kranjcich et al. ........... | 226/142 |
| 3,835,231 A | * | 9/1974 | Marchner ..................... | 373/78 |
| 6,521,170 B2 | * | 2/2003 | Stercho ........................ | 266/44 |

* cited by examiner

Primary Examiner—Scott Kastler
(74) Attorney, Agent, or Firm—Clifford A. Poff

(57) ABSTRACT

An electric steel-making furnace has a furnace roof carried by an upper furnace shell on a lower furnace shell to substantially envelop an atmosphere above liquid steel and slag floating thereon in the lower furnace shell. A transfer car supports the lower furnace shell for transport from a furnace-operating site to a remote exchange site for exchanging one or more of the furnace roof, the upper furnace shell and the lower furnace shell. The furnace transfer car has a furnace support platform engaged with the lower furnace shell and supported for tilting of the furnace on the transfer car by actuators at the furnace operating site in a direction to increase the depth of slag at the deslagging passageway for decanting slag floating on liquid steel in the lower furnace shell. Actuators are also provided to tilt the furnace on the transfer car to increase the depth of liquid steel at a tap hole assembly during tapping of a steel heat.

27 Claims, 18 Drawing Sheets

METHOD AND APPARATUS FOR DESLAGGING AND TAPPING AN INTEGRATED ELECTRIC STEEL MAKING FURNACE

CROSS REFERENCE TO RELATED APPLICATIONS

This application is a continuation in part of application Ser. No. 09/738,095 filed Dec. 16, 2000 now U.S. Pat. No. 6,521,170 and related to applications Ser. No. 09/737,440 filed Dec. 13, 2000; Ser. No. 09/739,851 filed Dec. 18, 2000; and Ser. No. 10/039,672 filed Nov. 07, 2001.

BACKGROUND OF THE INVENTION

1. Field of the Invention

The present invention relates to deslagging a steel making furnace using electrical current as a heat source to refine liquid steel and, more particularly, to such a furnace supported on a transfer car designed and constructed to tilt such a furnace toward a slag door end of the furnace for decanting slag and, if desired, tilt the furnace in an opposite direction for tapping a heat of steel during consecutive furnace cycles.

2. Description of the Prior Art

It is known in the art of steel making to use electric current as a heat source in a steel making furnace. Arc heating furnaces are used to heat a metal charge by either heat radiation from arcs passed between electrodes above the metal charge or by arcs passing from the electrodes to the metal charge where heat is generated by the electrical resistance of the metal charge. When the furnace has an electrically conductive furnace bottom, the bottom forms part of an electrical circuit powered by direct current. When the furnace has a non-conductive furnace bottom, the electrical circuit is powered by alternating current and the circuit is limited to the electrodes and metal charge. Induction furnaces are also used to heat a metal charge by using either inductors according to a transformer principle where the secondary winding is formed by a loop of liquid metal in a refractory channel or a coreless principle where induction coils surround the furnace wall and generate a magnetic field to impart energy to the metal charge in the furnace.

The present invention is applicable to such electric furnaces and in particular to an alternating current direct arc electric furnace equipped with three electrodes powered by three phase alternating current to establish arcs passed from an electrode to a metal charge, to another electrode and from electrode to electrode. The direct-arc electric-furnace as used in the steel industry is primarily a scrap-melting furnace, although molten blast-furnace iron and direct-reduction iron (DRI) are also used for charging the furnace. Combinations of scrap and minor quantities of blast furnace iron or direct reduction iron are common furnace charging compositions. A three-phase transformer, equipped for varying the secondary voltage, is used to supply electrical energy at suitable range of power levels and voltages. Cylindrical solid graphite electrodes are suspended by a mechanism from above the furnace downwardly through ports in a furnace roof to positions so that the electrodes conduct the electric current inside the furnace to maintain arcs for melting and refining a furnace charge. A sidewall supports the roof on a lower shell, which is provided with a refractory lining to contain the metal charge. In the electric furnaces known in the art, it is well known to pivotally support the lower furnace shell on a foundation and provide a furnace tilting drive to tilt the furnace in each of opposite directions for de-slagging and tapping. Other drive mechanisms are necessary to remove the roof from the upper shell to gain access to the furnace interior for the introduction of a metal charge.

It is known in the art to retain a quantity of the steel in the furnace after tapping which is commonly called a wet or hot heel practice. However, the structural integrity of the furnace mandates that the slag line be inspected periodically, typically every three to twelve heats with repairs performed based on the slag line condition. Generally, gunning will be performed several times a week. Periodically, every two-three weeks, the complete furnace bottom will be exchanged with a newly rebuilt bottom and worn bottom will have its sidewalls in the slag line area undergo a major repair or the complete refractory lining replaced.

The shortcomings of known electric furnaces are addressed in my patent application Ser. No. 09/737,440 filed Dec. 13, 2000 by the providing a transfer car to support a furnace shell with a sloping floor extending downwardly to a tap hole. A steel melt is refined in the furnace by maintaining a flat bath operation using electric current and the heat of a liquid hot heel consisting of at least 70% of tapped steel. Deslagging and tapping are performed while the lower furnace shell remains stationary at a furnace operating position on the transfer car. The lower furnace shell and if necessary the upper furnace shell or both the upper furnace shell and the furnace roof can be transported by a transfer car without the use of cars to a furnace component exchange position remote to the furnace operating position. This allows replacement of worn and damaged furnace components and quick reassembly of the furnace on the transfer car for movement back to a furnace operating position with a minimized down time.

The decanting of slag from the furnace on the transfer car is limited to the depth of slag at a slag discharge trough formed in the lower shell, vertically displaceable door is positioned to close the slag trough during refining of a steel melt. It is necessary to retain residual slag during tapping to control the metallurgy of the steel heat. The volume of the residual slag can be controlled by the height of the liquid steel in the furnace at the start of tapping. Such control is exercised by continuing the charging of scrap or other steel forming material until shortly e.g. three minutes, before tapping. However, such a measure for controlling the retention of residue slag introduces undesirable time constraints to the scheduling of tapping intervals.

Accordingly, it is an object of the present invention to tilt an electric steel making furnace while mounted on a transfer car stationed at a furnace operating site for decanting slag floating on the surface of liquid steel through a deslagging opening prior to tapping or at any other time during the furnace operation.

It is another object of the present invention to support a lower furnace shell of an integrated electric steel making furnace using a transfer car having a tilt drive for tilting the lower furnace shell while stationed at a furnace operating site in a manner to lower the refractory slag retention level at a slagging door end of the furnace for decanting slag.

It is another object of the present invention to downwardly tilt an electric steel making furnace carried on a furnace transfer car at the operating site for the furnace in an inclined fashion to lower the refractory slag retention level towards a slag door end of the furnace such that the electrode extending in the furnace, and other connections to the furnace permit the tilting of the furnace without disconnection or retraction of any connection particularly including the continuous supply of electrical power for operation of the electrodes while decanting slag and, if desired, while tapping of liquid steel heat.

It is another object of the present invention to tilt an electric steel making furnace mounted on a transfer car at a furnace operating site downwardly in an inclined fashion for deslagging and, if desired, for tapping by providing a flexible wheeled bogey assembly with a single pivot point controlled by a tilt arm at opposite sides at one end of the furnace and a pivot point fixed to the car frame at the opposite and non-operating end of the furnace.

BRIEF SUMMARY OF THE INVENTION

According to the present invention there is provided an electric steel-making furnace including the combination of a furnace roof carried by an upper furnace shell on a lower furnace shell to substantially envelop an atmosphere above liquid steel and slag floating thereon in the lower furnace shell, the lower furnace shell having a refractory lining with a deslagging passageway in a sidewall thereof, a transfer car supporting the lower furnace shell for transport from a furnace operating site to a remote exchange site for exchanging one or more of the furnace roof, the upper furnace shell and the lower furnace shell, and a support including an actuator to tilt the lower furnace shell at the furnace operating site on the transfer car in a direction to increase the depth of slag at the deslagging passageway for decanting slag floating on liquid steel in the lower furnace shell.

Accordingly, the present invention also provides a method for producing steel in an electric furnace, the method of including the steps of providing an electric furnace including a transfer car supporting a lower furnace shell having a sidewall containing a deslagging passageway at an end of a floor wall opposite to a tap hole, refining consecutively steel heats in the electric furnace while residing on the transfer car at a furnace operating site, decanting slag floating on consecutively refined steel heats by using the transfer cat to tilt the lower furnace shell in a direction to increase the slag depth at the deslagging passageway, tapping liquid steel from consecutive steel heats after decanting slag there from by using the transfer car to tilt the lower furnace shell in a direction to increase the liquid steel depth at the tap hole, transporting the lower furnace shell on the transfer car from the furnace operating site to a remote lower furnace exchange site, using the transfer car to transport a replacement lower furnace shell to the furnace operating site, and thereafter repeating the steps of refining, decanting, and tapping.

BRIEF DESCRIPTION OF THE SEVERAL VIEWS OF THE DRAWINGS

The present invention will be more fully understood when the following description is read in light of the accompanying drawings in which.

DETAILED DESCRIPTION OF THE INVENTION

Figure 1:
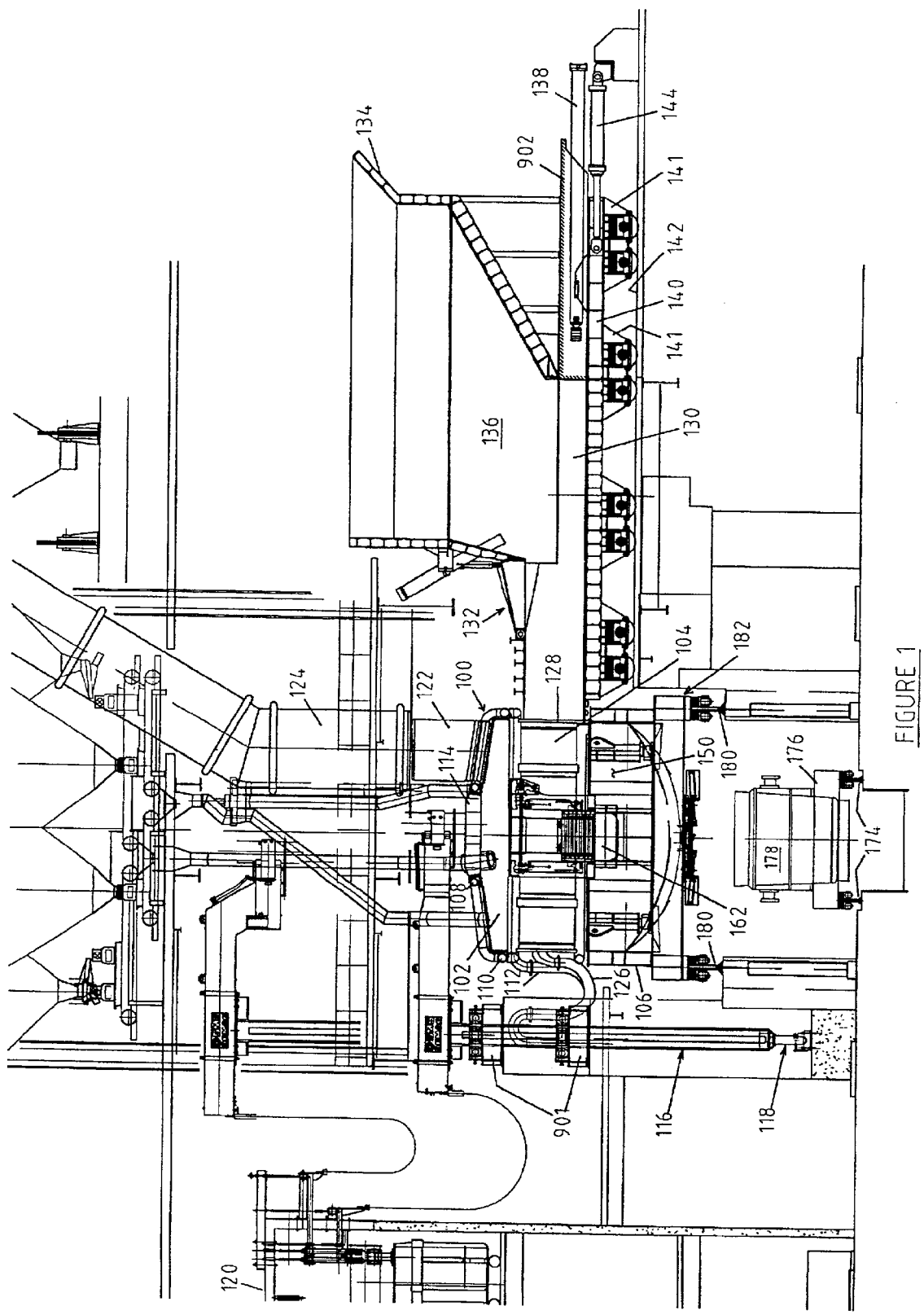
FIG. 1 is a front view of a preferred embodiment of an electric arc furnace installation embodying the features of the present invention.
Figure 2:
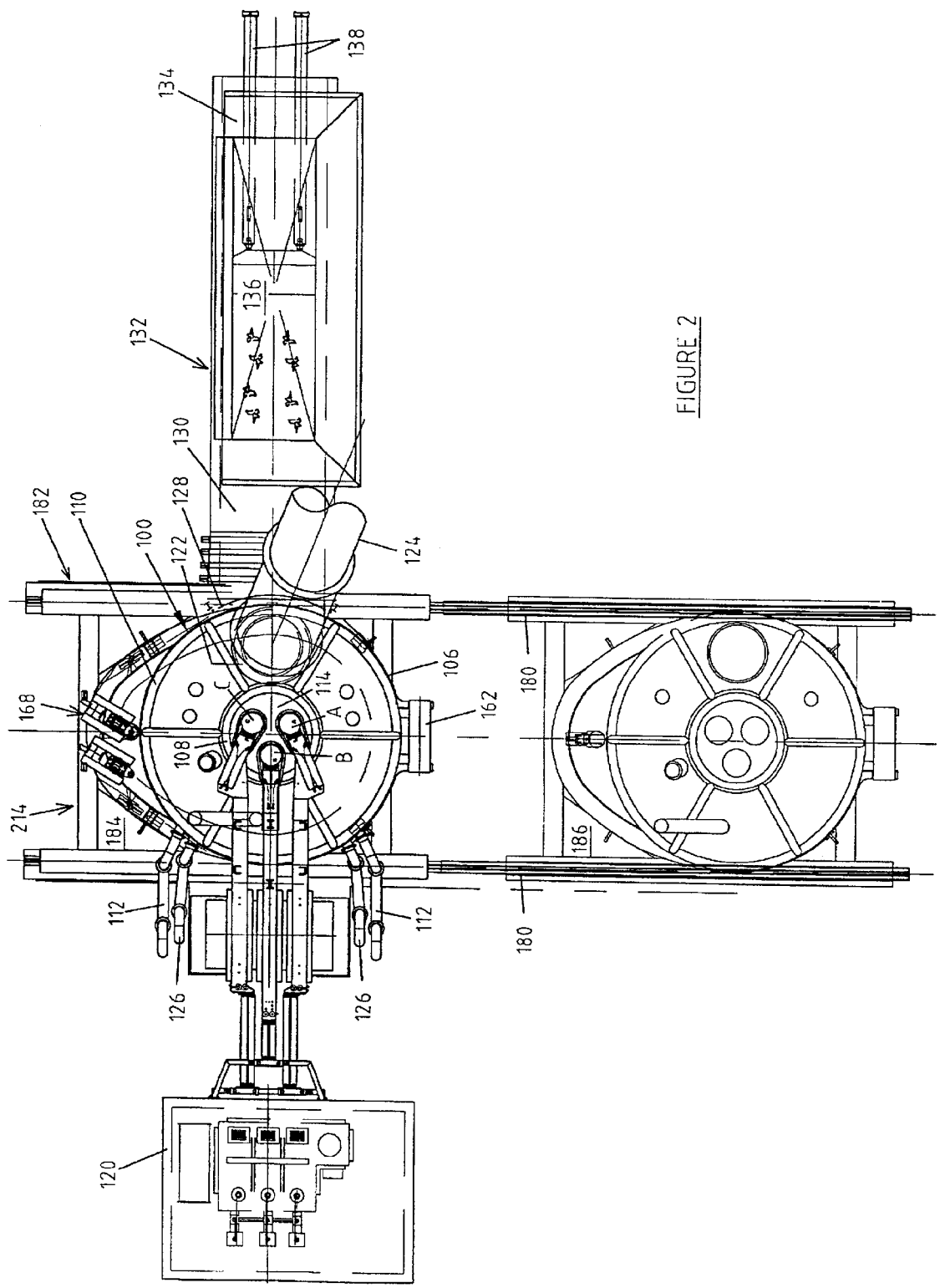
FIG. 2 is a plan view of the electric arc furnace installation shown in FIG. 1.
Figure 3:
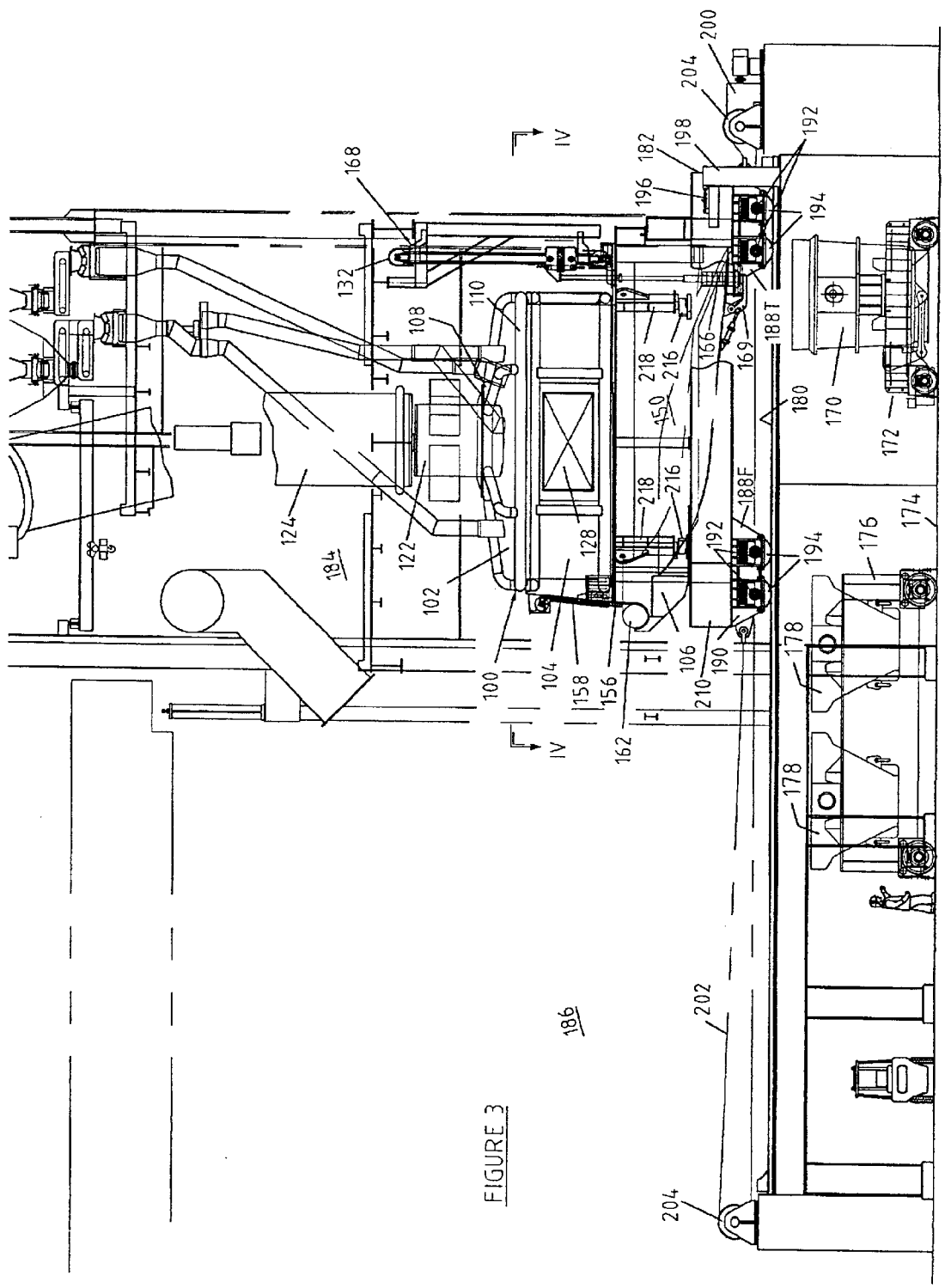
FIG. 3 is a side elevational view of the electric arc furnace illustrated in FIG. 1.

FIGS. 1, 2 and 3 illustrate a preferred form of electric arc steel making furnace facility for carrying out the method and incorporating apparatus to decant slag and, if desired, facilitate tapping of liquid steel according to the present invention. The electric steel-making furnace 100 includes a furnace roof 102 carried by an upper furnace shell 104 on a lower furnace shell 106 to substantially envelop an atmosphere above liquid steel and slag floating on the steel bath contained in the lower furnace shell. The furnace roof 102 includes roof panels formed by an array of side-by-side coolant pipes with the coolant passageways communicating with annular upper and lower water supply headers 108 and 110, respectively, interconnected by radial distributing pipes to form a water circulating system communicating with service lines 112 containing water supply and return lines. The service lines include flexible sections to avoid the need to disconnect the service lines when it is desired to tilt the furnace for deslagging, tapping and lifting of the furnace roof alone or the furnace roof combined with the upper furnace shell a short distance, e.g., 24 inches, for servicing the lower furnace shell. The upper water supply header 108 encircles a triangular array of three apertures in a roof insert 114. The apertures are dimensional and arranged to accept phase A, B and C electrodes independently carried by electrode support arms and positioned vertically by a support columns 116. The columns 116 are restrained by horizontally spaced guides 901 in a furnace support platform for vertical displacement by actuator 118, typically a piston and cylinder assembly. The electrode support arms also support water-cooled cables for transmission of electrical current from transformers in a transformer vault 120 to the respective phase A, B and C electrodes.

A fume duct 122 extends vertically from an annular opening in the furnace roof 106 between the upper and lower water supply headers 108 and 110 for exhausting the fume from the interior of the furnace to an enlarged and vertically spaced overlying duct 124 formed by water coolant piping to cool the fume and to provide thermal protection. The construction of the side wall of the furnace upper shell 104 includes superimposed convolutions of coolant pipes supplied with coolant from spaced apart supply headers that are interconnected by vertical distribution pipes to form a coolant circulating system communicating with service lines 126 containing water supply and return lines. The coolant pipes of the furnace roof and the coolant pipes of the furnace upper shell may support metal panels for reducing the possibility for escape of fume from the atmosphere within the confining boundaries formed by these furnace components. The service lines 126 include flexible sections which in combination with the flexible sections in service lines 112 avoid the need to disconnect the service lines when it is desired to tilt the furnace for deslagging, tapping and lifting of the furnace roof combined with the upper furnace shell a short distance, e.g., 24 inches, for servicing the lower shell. The convolutions of coolant pipes forming an annular shape to the upper furnace shell 104 are arranged to form a scrap charging opening 128 in one geometrical quadrant of the upper furnace shell.

The scrap charging opening 128 is used to introduce a charge of scrap preferably to introduce quantities continuously or at desired intervals which can be closely spaced apart by only minutes and extend throughout the major portion of the furnace operating cycle or continuous with uninterrupted scrap flow. The scrap charging opening 128 receives an end portion of a scrap discharge chute 130 of a scrap charger 132 shown in FIGS. 1 and 2. The end portion of the chute 130 is constructed from plate covered on the exterior by convolutions of coolant channels joined together in an edge-to-edge relation to circulate coolant water for preventing thermal destruction of the end portion of the chute while residing in the highly heated environment in the furnace. The extent to which the chute project into the furnace is selected to assure scrap will fall directly into the liquid metal bath and not impact with the refractory of the sidewall. The scrap charger 132 essentially includes a scrap holding bunker 134 having a scrap fall space 136 extending to the underlying scrap discharge chute 130. The scrap charger 132 is supplied with scrap by any of diverse, well known scrap transportation facilities. A pusher ram 902 is advanced and retracted along the scrap delivery chute 130 by piston and cylinder assemblies 138 to charge scrap into the furnace. The scrap charger is mounted on a transfer car 140 having pairs of spaced apart wheel assemblies 141 for movement along rails 142 by a piston and cylinder assembly 144. The transfer car is positioned along the rails 142 between an operative position wherein the forward end of a scrap delivery chute 130 is extended through the charging opening 128 for charging scrap and an inoperative position wherein the scrap delivery chute 130 is retracted and remotely positioned from the steel making furnace to allow freedom of movement of the furnace independently of the scrap charger 132.

Figure 4:
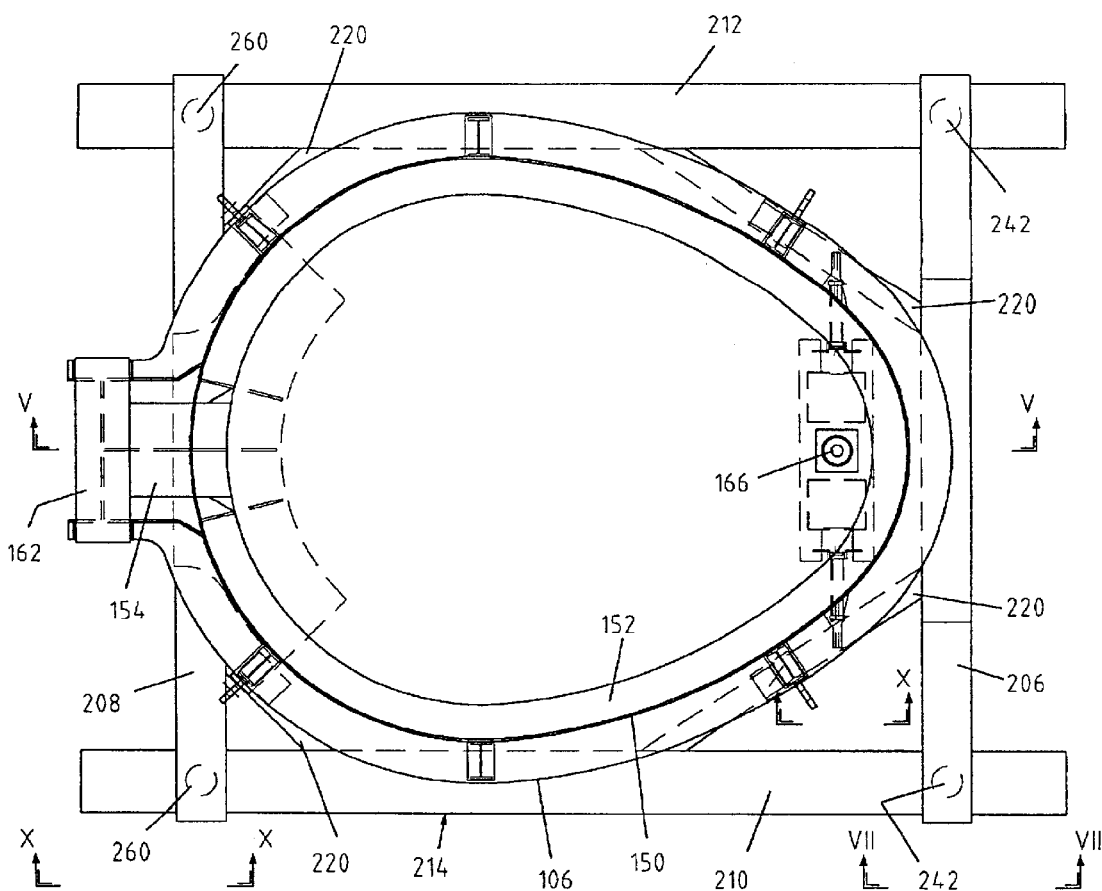
FIG. 4 is a plan view taken along lines IV—IV of FIG. 3.
Figure 5:
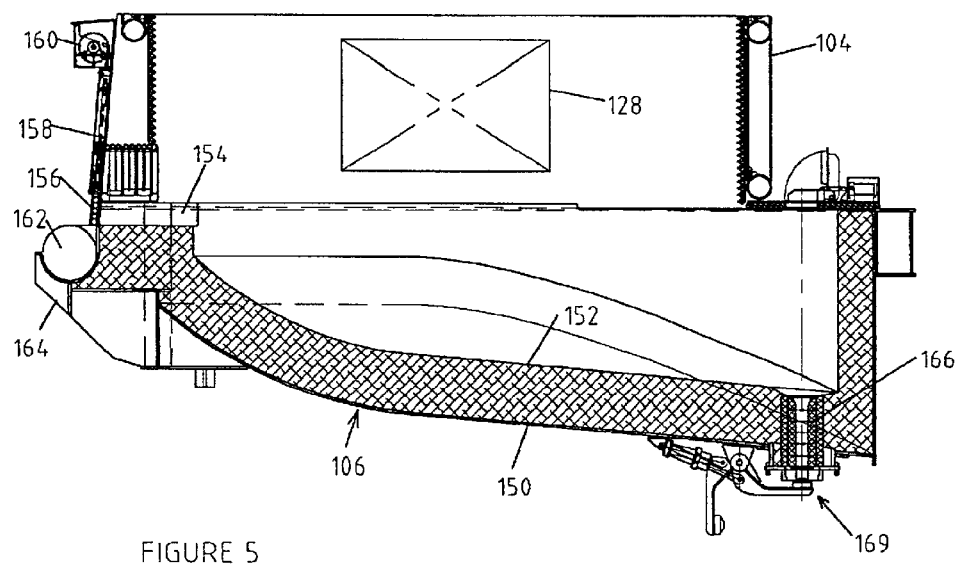
FIG. 5 is a sectional view taken along lines V—V of FIG. 4.

As best shown in FIGS. 4 and 5, the lower furnace shell 106 includes an outer metal frame 150 containing an inner refractory lining 152 extending along a bottom wall and side walls of the frame for providing a thermal protective barrier against the intensive heat of a metal charge during refining including melting of newly charged metal scrap. The refractory lining 152 is formed with a slag discharge trough 154, which is closed by vertically moveable slag door 156 supported by side rails 158 mounted on the coolant piping of the upper furnace shell 104. The slag door 156 is joined by control rods to actuator discs 160 which are rotated in a conventional manner to raise the slag door 156 when it is desired to decant slag from the furnace. Slag emerging from the furnace trough 154 passes across a threshold formed by a carbon rod insert 162 supported by suitable brackets 164 on the frame 150 of the lower furnace shell 106. At a side of the furnace opposite the location of the slag discharge trough 154 there is located a tap hole assembly 166 formed by a superimposed stack of ceramic disks supported in the refractory lining 152. A tap hole assembly 166, per se well known in the art and shown schematically in FIGS. 2 and 3 is used to fill the tap hole with sand at the conclusion of the tapping of a steel heat. The tap hole assembly 166 may take the form of a truncated conical tap hole with a correspondingly shaped stopper assembly as disclosed by German Patent No. 198 26 085. An emergency tap hole closure mechanism 169, as shown in FIG. 5 can be operated to move a tap hole closure plug into a closure position to seal off the tap hole.

A steel heat is tapped from the furnace into a ladle 170 positioned by a transfer car 172 along rails 174 into a position to receive the stream of liquid steel emerging from the tap hole assembly 166. The rails 174 are also used to position a transfer car 176 carrying a slag pots 178 to a position for receiving slag decanted from the furnace as a stream of slag flows across the threshold formed by carbon rod insert 162. Rails 180 extend along opposite sides and above the rails 174 for supporting a furnace transfer car 182 used to engage and support the lower furnace shell 106 and the upper furnace shell 104 and the furnace roof 102 in a superimposed relation. The furnace transfer car 182 is moved along the rails 180 from furnace operating site 184 to a furnace exchange site 186. The furnace remains positioned throughout repetitive furnace operating cycles at the furnace-operating site 184.

The furnace transfer car 182 includes sets of forward wheel assemblies 188F at the leading end of the car as defined by advancing movement from the furnace operating site and sets of trailing wheel assemblies 188T at the rearward end of the car for support of the furnace at the furnace operating site. The wheel assemblies 188F and 188T are identically constructed with a U-shaped wheel housing 190 containing spaced apart and downwardly extending slots in apposed sidewalls for receiving bearing blocks 192 mounted on opposite ends of axes extending from the opposite sides of railway type wheels 194. A ratchet binder 196 at each of the opposite lateral sides of the transfer car interconnects the wheel sets 188T with stops 198 to prevent uncontrolled movement of the transfer car during operation of the furnace. The sets of wheel assemblies execute rolling contact along the spaced apart rails 180 when the ratchet binders 196 are released and a winch 200 is operated to advance the furnace transfer car 182 by a cable 202 extending between spaced apart pulleys 204 at the outer most locations of the furnace operating site 184 and the furnace exchange site 186. The ends of the cable are connected to side beams 210 and/or 212, which are joined with cross beams 206 and 208 to form part of a furnace support platform 214. Control elements for the operation of the furnace include a load cell 216 at each load transfer support site for the lower furnace shell 12 on the furnace support platform 214. Each load cell is situated in a force transmitting relation between a strut 218 on a vertical sidewall of the outer metal frame 150 of the lower furnace shell and a support beam 220 extending diagonally between each of the side beams 210 and 212 and end beams 206 and 208 of the furnace support platform 214.

Figure 6:
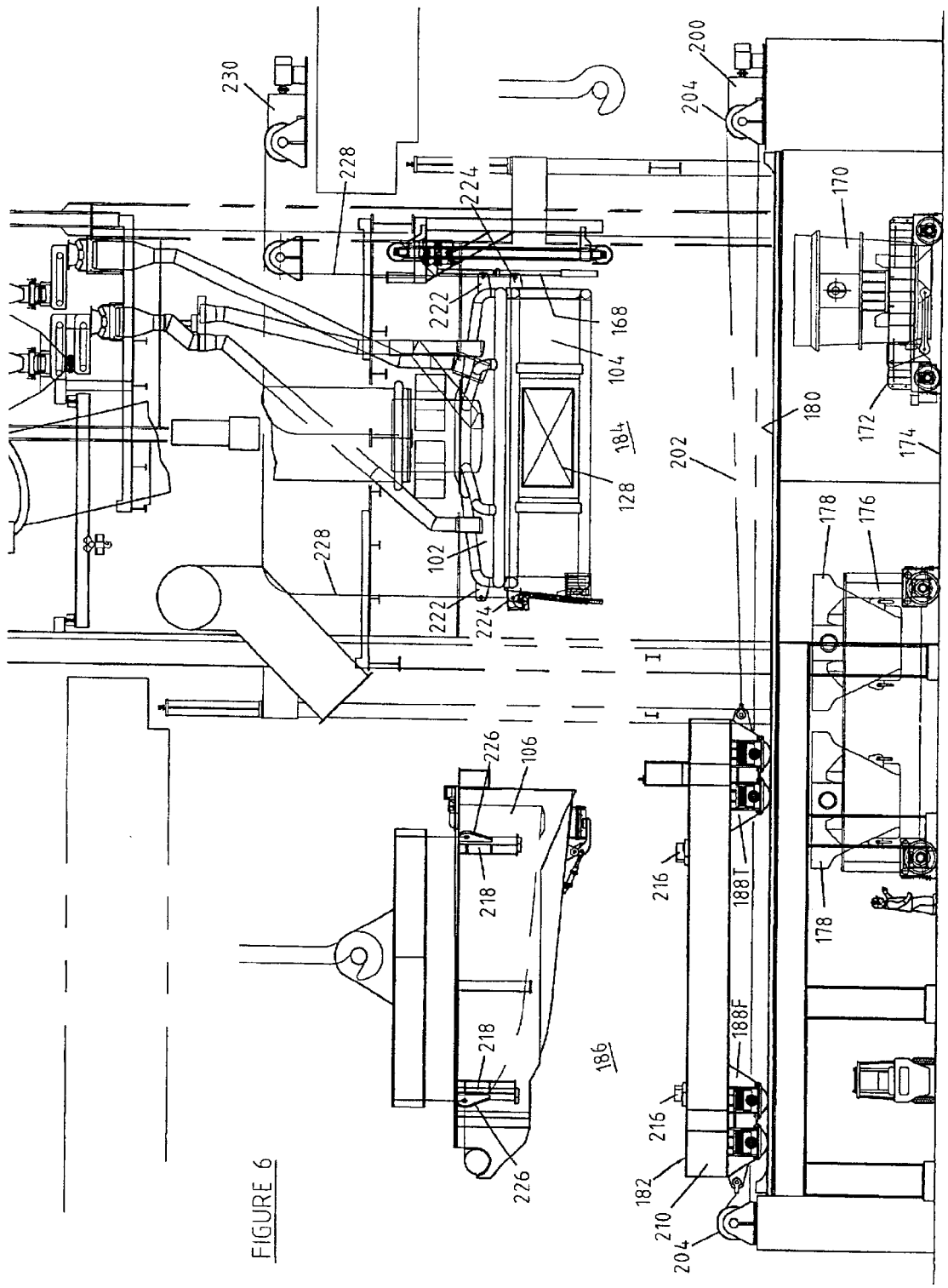
FIG. 6 is a side elevational view similar to FIG. 5 and illustrating the suspension of each of the furnace roof and an upper shell for servicing of the lower furnace shell at the lateral side of the furnace operating position.

Referring to FIG. 6, the furnace roof 102, upper furnace shell 104 and lower furnace shell 106 will require periodic repairs but at widely varying time intervals. For example, it is likely that the lower furnace shell 106 will require repair of the refractory and replacement of the refractory lining at more frequent intervals than the need to repair the furnace roof and upper furnace shell. The downtime of the furnace is an important economic factor and to minimize the downtime, the furnace roof is provided with lifting lugs 222 at spaced locations about the upper outer periphery thereof. The upper furnace shell is also provided with lifting lugs 224 at spaced apart locations about the upper outer periphery thereof. The lower furnace shell is provided with lifting lugs 226 secured to the upper parts of the struts 218. When it is necessary to service the lower furnace shell, the coolant supplies provided by service lines 112 and 126 for the furnace roof and the upper furnace shell are turned off but the supply lines remain connected. The scrap-charging chute 132 is retracted from charging opening 128 in the upper furnace shell. Strands of wire rope 228 are paid out from spools operated by a winch drive 230. Each wire rope is secured to an upper shell lifting lug 224 and then the winch drive 230 is operated to lift the upper furnace shell 14 and the furnace roof 16 as a unit and a distance sufficient to allow movement of the furnace transfer car 182 and lower furnace shell 106 from the operating site 184 to the furnace component exchange site 186.

After the lower shell is removed from the furnace transfer car 182 at the furnace component exchange site 186, a replacement lower shell is seated in position with the struts 218 resting on the load cells 216. The furnace transfer car is then returned to the operating site 184 by operation of the winch 200. The ratchet binders 196 are then used to draw the furnace transfer car against the stops 198. The upper furnace shell and furnace roof can then be lowered for support on the lower furnace shell. The A, B and C electrodes and retractable scrap chute 132 are the placed in their operative positions and the furnace is ready to resume operation. When the upper furnace shell must be serviced, then only the furnace roof is lifted and retained at the furnace operating site while the furnace transfer car is used to transport the upper furnace shell while seated on the lower furnace shell to the furnace component exchange site and then return the replacement upper furnace shell operatively seated on the lower furnace shell to the furnace operative site. When the entire furnace, only the furnace roof or the furnace roof and the upper shell and/or the lower shell require service, then the entire furnace is transferred by the furnace transfer car to the furnace component exchange site 186 and a reassembled furnace on the furnace transfer car is returned to the furnace operating site 184. These usages of the furnace transfer car allow the use of mill cranes to transfer large furnace components without obstruction due to facilities associated with the operation of the furnace such as the fume duct, electrodes and scrap charging.

Figure 7:
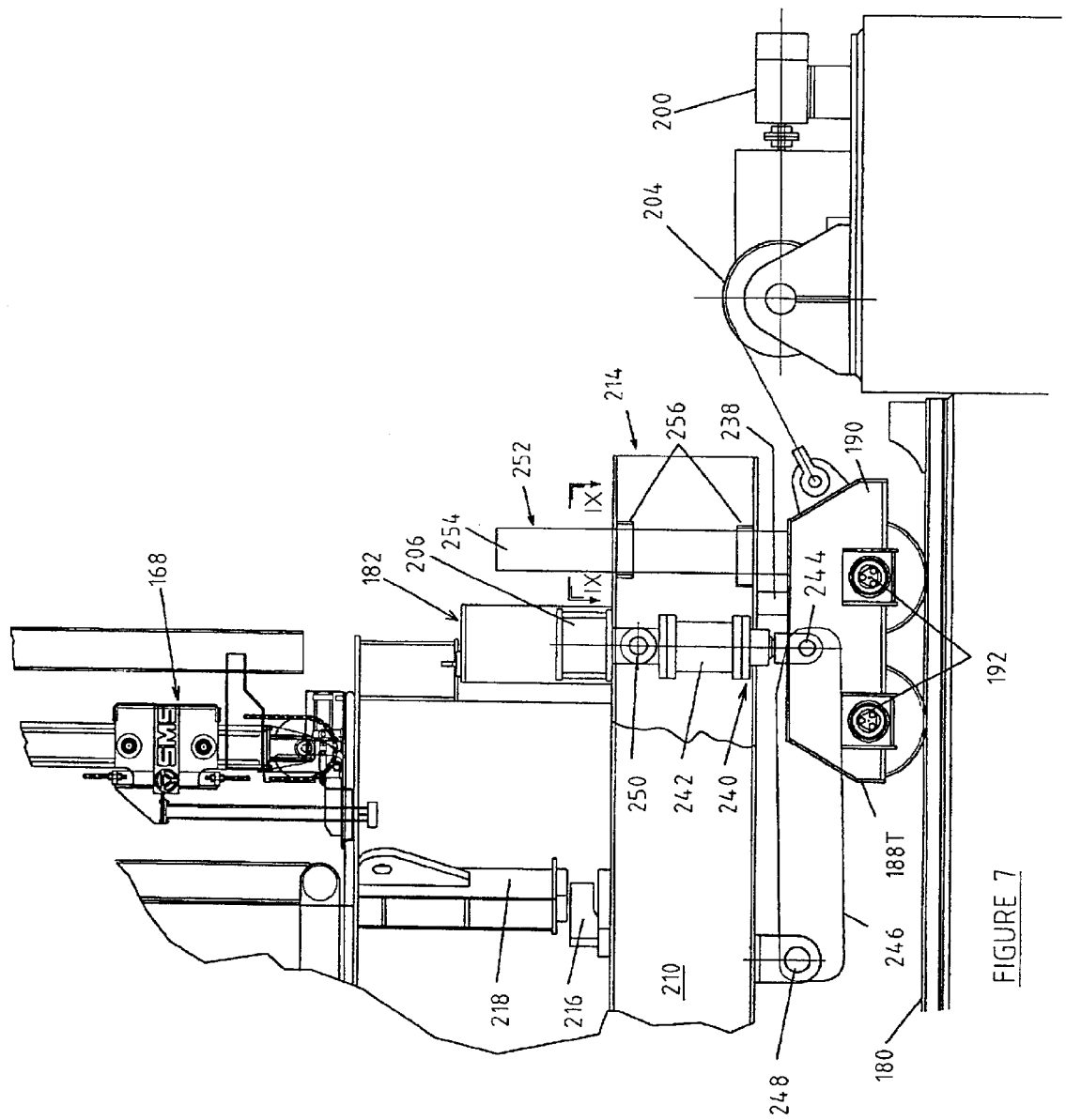
FIG. 7 is a an enlarged fragmentary view in elevation taken along lines VII—VII of FIG. 4 to illustrate the preferred embodiment of the arrangement of parts for supporting an electric arc furnace during the refining of steel heat before decanting slag.
Figure 8:
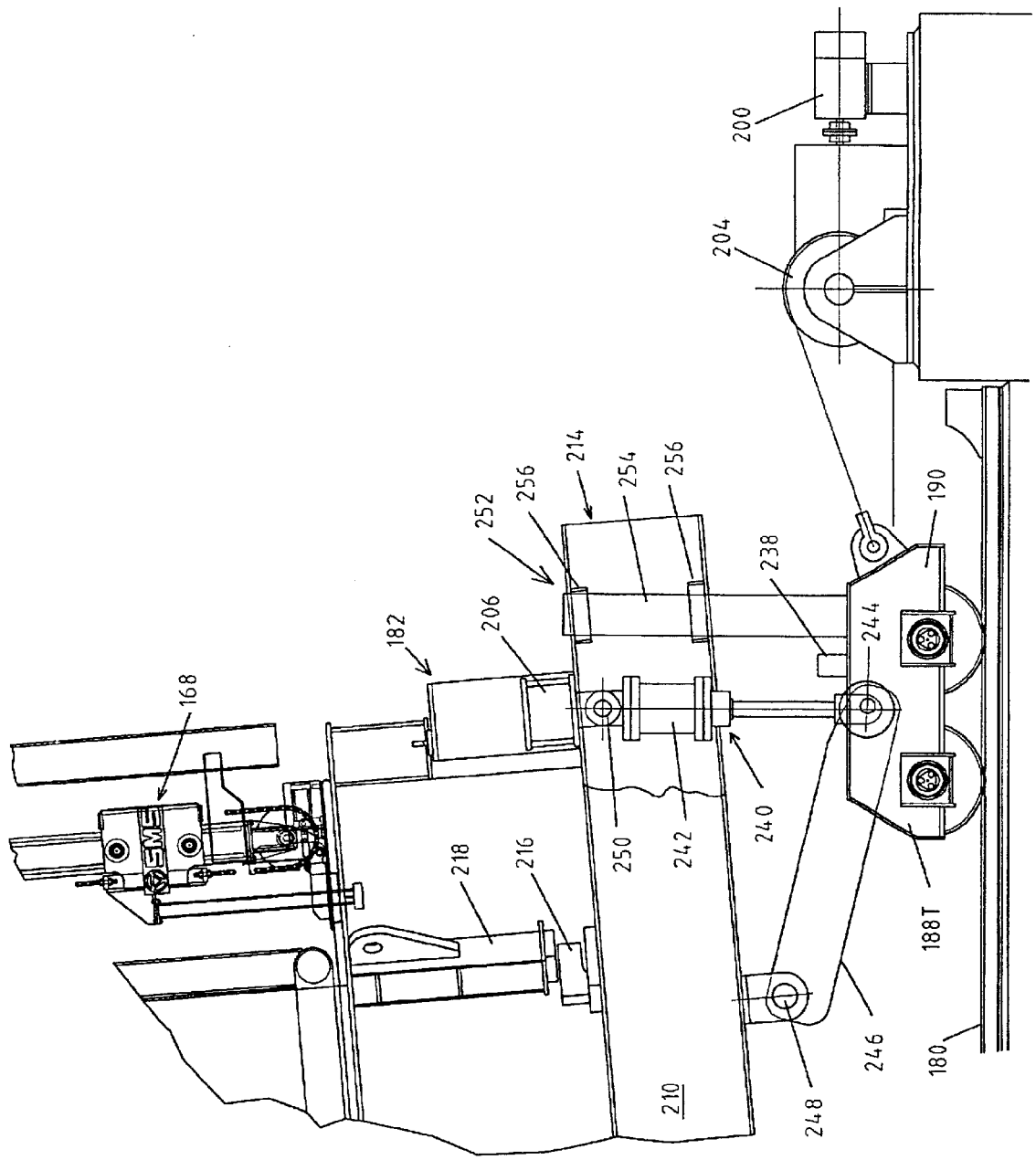
FIG. 8 is a view similar to FIG. 7 and illustrating the arrangement of parts for tilting the electric arc furnace to decant slag.

The first embodiment of apparatus of the present invention which is also useful to practice the method thereof provides as shown in FIGS. 7 and 8 that the furnace support platform 214 as part of the furnace transfer car 182 includes support blocks 238 at the four corners of the furnace support platform 214 and forming load bearing elements between the furnace support platform 214 and the forward and trailing wheel assemblies 188F and 188T, respectively. The support blocks 238 are secured to each of the wheel assemblies 188F and 188T. The furnace support platform 214 separates from the support blocks 238 on the trailing wheel assemblies 188T during tilting of the furnace in this embodiment for decanting slag. The furnace support platform 214 further includes actuator support structures 240 to tilt the lower furnace shell and thus also the superimposed furnace components supported thereby which essentially comprise the upper furnace shell 106 and the furnace roof 102 at the furnace operating site on the transfer car in a direction to increase the depth of slag at the deslagging passageway 154 for decanting slag floating on liquid steel in the lower furnace shell. The structures 240 include a piston and cylinder assembly 242 at each of the trailing wheel assemblies 188T, which are located at the opposite sides of the tap hole assembly 166 and at a side of the lower furnace shell opposite to the site of the deslagging passageway 154. Each of the piston cylinder and assemblies 242 has a rod end secured by a pivot shaft 244 to one of the wheel housings 190 of the trailing wheel assemblies 188T and to one end of a pivot control arm 246. The free end of the pivot control arm 246 is engaged with the furnace support platform 214 by a pivot shaft 248 mounted to clevis plates on the bottom surface of the overlying one of the side beams 210 and 212. The cylinder end of each of the piston and cylinder assemblies 242 is mounted by a clevis 250 to the cross beam 206.

Figure 9:
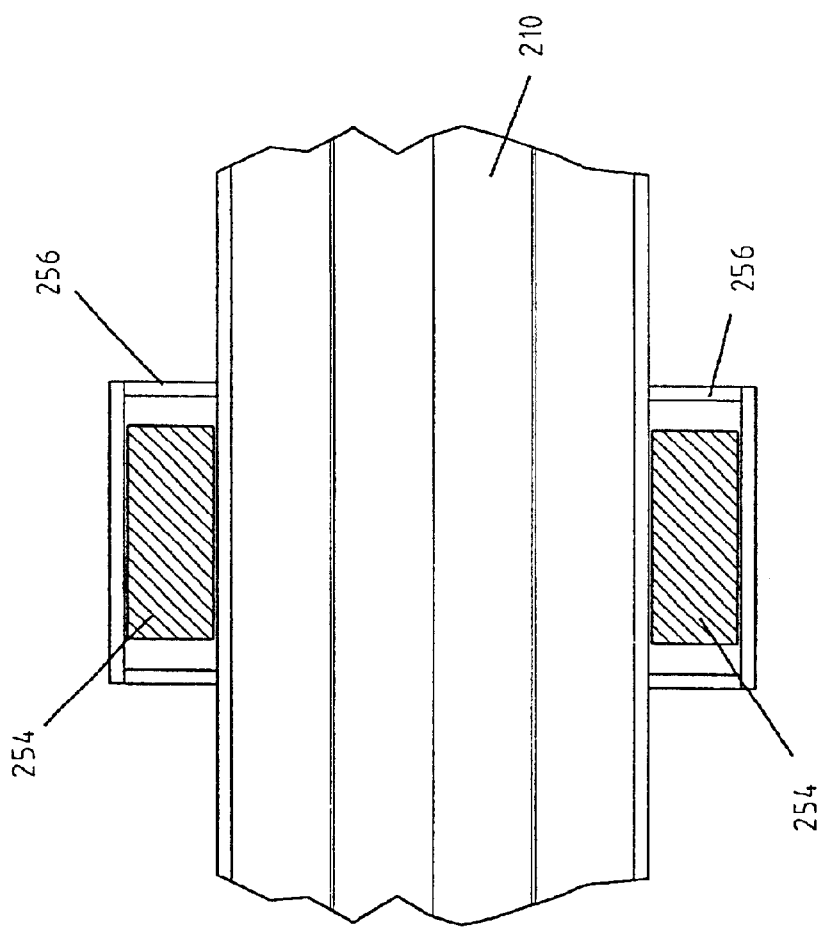
FIG. 9 is a sectional view taken along lines XI—XI of FIG. 7.

The actuator support structure 240 further includes frame stabilizers 252 operatively interconnecting the furnace support platform 214 and the wheel housing 190 of the trailing wheel assemblies 188T. As shown in FIGS. 7, 8 and 9, the frame stabilizers each include spaced apart guide bars 254 secured to the wheel housing 190 and extending upwardly through two vertically spaced guides 256 secured to each of opposite sides of the overlying one of the side beams 210 and 212. The actuator support structure 240 is actuated for raising the furnace support platform 214 and thereby tilting the furnace from the normal operating position by lifting the end of the furnace containing the tap hole assembly relative to the deslagging passageway. After the decanting of slag is completed, the furnace support platform 214 is returned to the normal operating position by operating the piston and cylinder assemblies 242 thereby lowering the end of the furnace containing the tap hole assembly relative to the deslagging passageway and reestablish load bearing contact with the support blocks 238 at the trailing wheel assemblies 188T.

Figure 10:
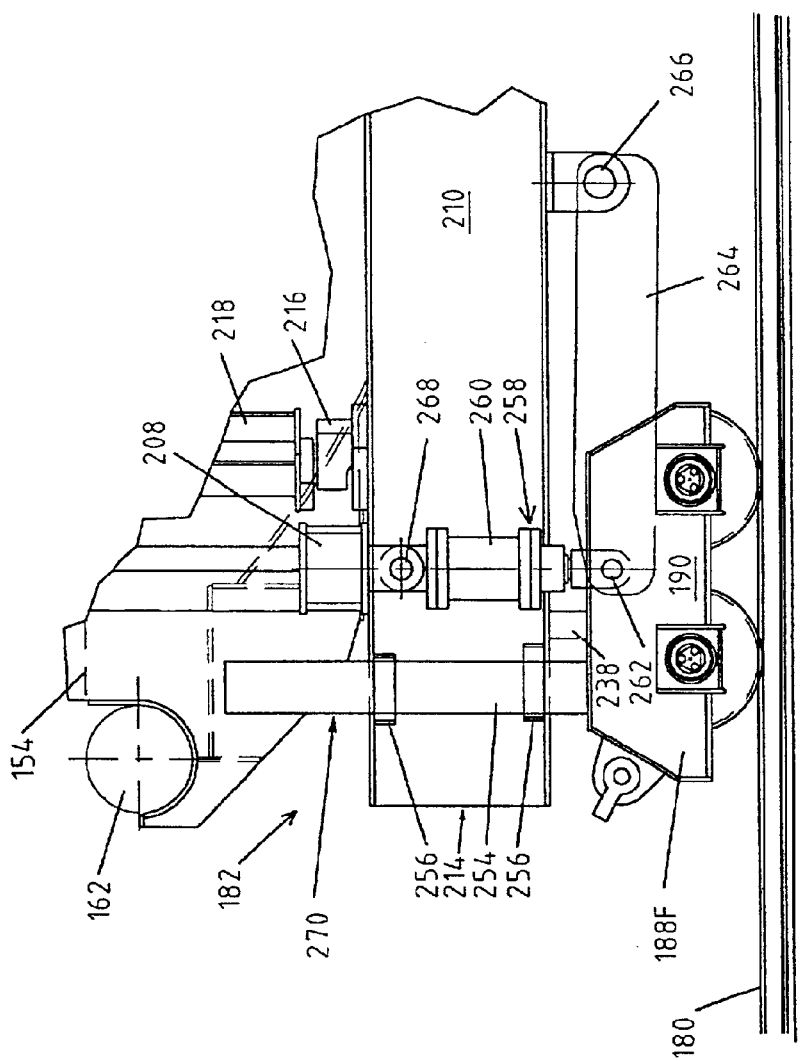
FIG. 10 is a an enlarged fragmentary view in elevation taken along lines X—X of FIG. 4 to illustrate the preferred embodiment of the arrangement of parts for supporting an electric arc furnace during the refining of steel heat before tapping of a steel heat.
Figure 11:
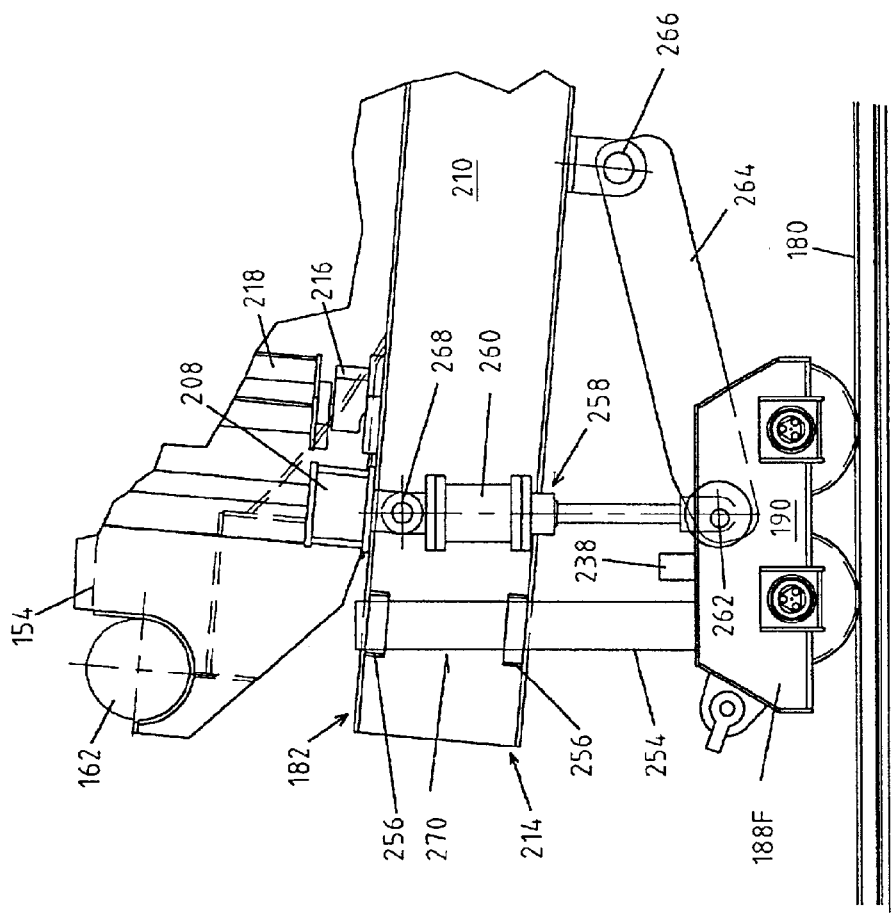
FIG. 11 is a view similar to FIG. 10 and illustrating the arrangement of parts for tilting the electric arc furnace for tapping of a steel heat.

The preferred embodiment of the present invention provides that, if desired, the furnace is tilted in a direction, which is opposite to the direction for decanting of slag, for the tapping of a steel heat. For this purpose, as shown in FIGS. 10 and 11, the furnace support platform 214 separates from the support blocks 238 on the forward wheel assemblies 188F during tilting of the furnace by operation of actuator support structures 258 to tilt the lower furnace shell and thus also the superimposed furnace components supported thereby comprising the upper furnace shell and the furnace roof at the furnace operating site on the transfer car in a direction to increase the depth of liquid metal at the tap hole assembly 166 for tapping liquid steel from the lower furnace shell. The structures 258 include a piston and cylinder assembly 260 at each of the forward wheel assemblies 188F, which are located at the opposite sides of the deslagging passageway 154. The structures 258 are therefore at a side of the lower furnace shell opposite to the site of the tap hole assembly 166. Each of the piston cylinder and assemblies 260 has a rod end secured by a pivot shaft 262 to one of the wheel housings 190 of the forward wheel assemblies 188F and to one end of a pivot control arm 264. The free end of the pivot control arm 264 is engaged with the furnace support platform 214 by a pivot shaft 266 mounted to clevis plates on the bottom surface of the overlying one of the side beams 210 and 212. The cylinder end of each of the piston and cylinder assemblies 260 is mounted by a clevis 268 to the cross beam 208. The actuator support structure 258 further includes frame stabilizers 270 operatively interconnecting the furnace support platform 214 and the wheel housing 190 of the forward wheel assemblies 188F. The construction of the frame stabilizers is per se the same construction as frame stabilizers 252 and the components bear the same reference numerals as set forth hereinbefore for frame stabilizers 252. The actuator support structure 258 is actuated for raising the furnace support platform 214 to thereby tilt the furnace from the normal operating position by lifting the end of the furnace containing the deslagging passageway relative to the tap hole assembly. After the tapping of a steel heat is completed, the furnace support platform 214 is returned to the normal operating position by operating the piston and cylinder assemblies 258 thereby lowering the end of the furnace containing the deslagging passageway relative to the tap hole assembly and reestablish load bearing contact with the support blocks 238 at the forward wheel assemblies 188F.

Figure 12:
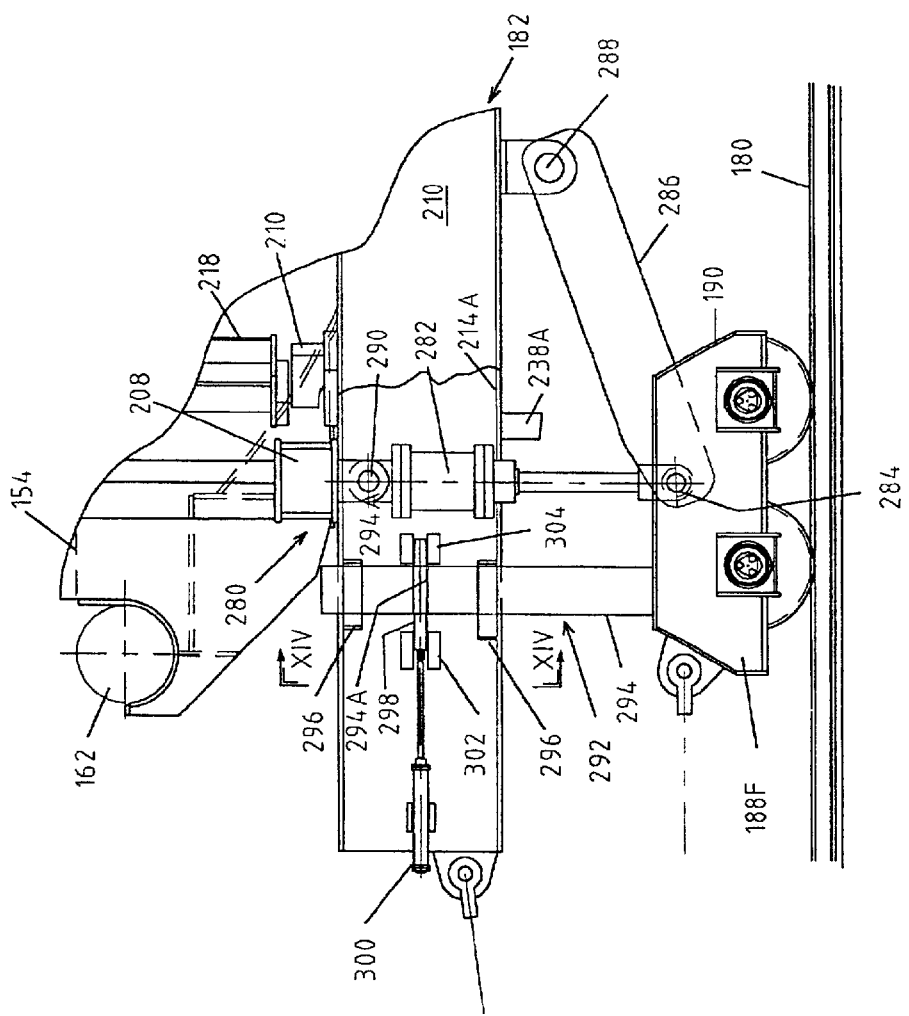
FIG. 12 is a an enlarged fragmentary illustration similar to the illustration of FIG. 7 to illustrate a second embodiment of the arrangement of parts for supporting an electric arc furnace during the refining of steel heat before decanting slag.
Figure 13:
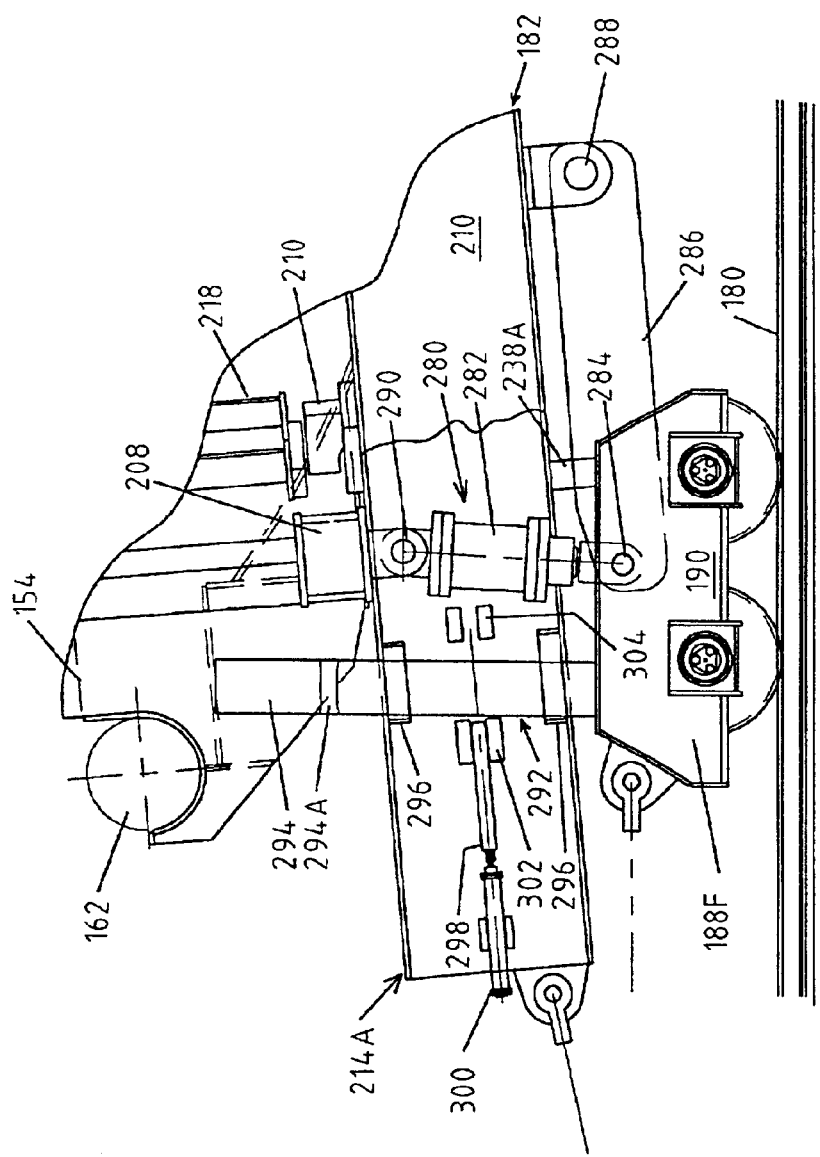
FIG. 13 is a view similar to FIG. 12 and illustrating the arrangement of parts of the second embodiment for tilting the electric arc furnace to decant slag.
Figure 14:
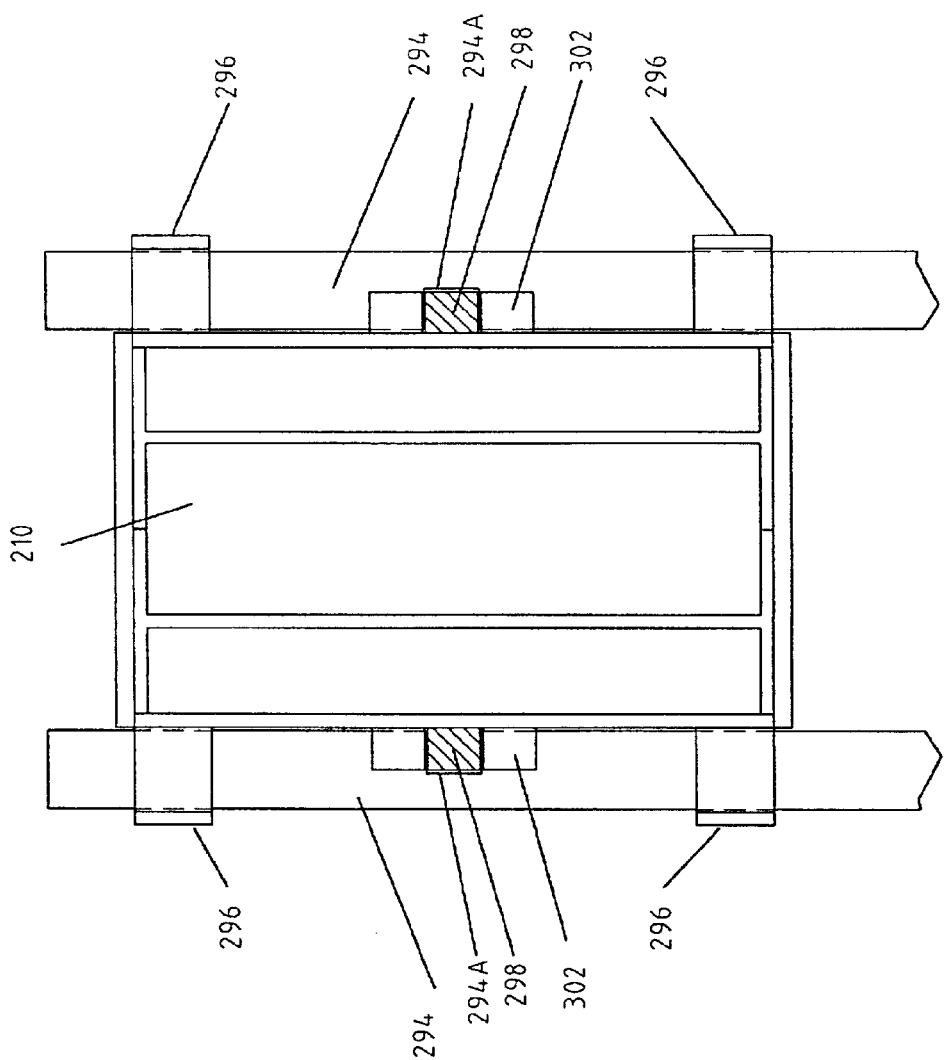
FIG. 14 is a sectional view taken along lines IVX—IVX in FIG. 12.

The second embodiment of apparatus of the present invention which is also useful to practice the method thereof provides as shown in FIGS. 12–14 provides that the furnace support platform 214A as part of the furnace transfer car 182 includes support blocks 238A secured to the four corners of the furnace support platform 214A and forming load bearing elements between the furnace support platform 214A and the forward and trailing wheel assemblies 188F and 188T, respectively. The furnace support platform 214A is tilted by lowering the end of the platform 214A toward the forward wheel assemblies 188F until the support blocks 238A engaged with the wheel assemblies 188F. The furnace support platform 214A further includes actuator support structures 280 to tilt the lower furnace shell and thus also the superimposed furnace components supported thereby which essentially comprise the upper furnace shell and the furnace roof at the furnace operating site on the transfer car in a direction to increase the depth of slag at the deslagging passageway 154 for decanting slag floating on liquid steel in the lower furnace shell. The structures 280 include a piston and cylinder assembly 282 at each of the forward wheel assemblies 188F which are located at the opposite sides of the deslagging passageway 154 and at a side of the lower furnace shell opposite to the site of the tap hole assembly 166. Each of the piston cylinder and assemblies 282 has a rod end secured by a pivot shaft 284 to one of the wheel housings 190 of the forward wheel assemblies 188F and to one end of a pivot control arm 286. The free end of the pivot control arm 286 is engaged with the furnace support platform 214A by a pivot shaft 288 mounted to clevis plates on the bottom surface of the overlying one of the side beams 210 and 212. The cylinder end of each of the piston and cylinder assemblies 282 is mounted by a clevis 290 to the cross beam 208.

The actuator support structure 280 further includes frame stabilizers 292 operatively interconnecting the furnace support platform 214A and the wheel housing 190 of the forward wheel assemblies 188F. The frame stabilizers each include spaced apart guide bars 294 secured to the wheel housing 190 and extending upwardly through two vertically spaced guides 296 secured to each of opposite sides of the overlying one of the side beams 210 and 212. The actuator support structure 280 is actuated for lowering the furnace support platform 214A and thereby tilting the furnace from the normal operating position by lowering the end of the furnace containing the deslagging passageway relative to the tap hole assembly. After the decanting of slag is completed, the furnace support platform 214A is returned to the normal operating position by operating the piston and cylinder assemblies 282 to thereby lift the end of the furnace containing the deslagging passageway relative to the tap hole assembly. Lock bars 298 on each of the side beams 210 and 212 are then linearly displaced by an associated one of piston and cylinder assemblies 300. The lock bars 298 are guided by load bearing retainer guide 302 and 304 at spaced locations along the guide bars. The lifting of the furnace to the normal operating position brings apertures 294A in the guide bars 294 into an aligned relation with the lock bars 298. The piston and cylinder assemblies 300 are then operated to displace the lock bars 298 beyond the retainer guides 302 through the apertures 294A and into locking engagement with the retainer guides 304. By this arrangement of the lock bar, the furnace remains in a mechanically locked and a stable operating position during the refining of steel independently of the operable functionality of the piston and cylinder assemblies 282.

Figure 15:
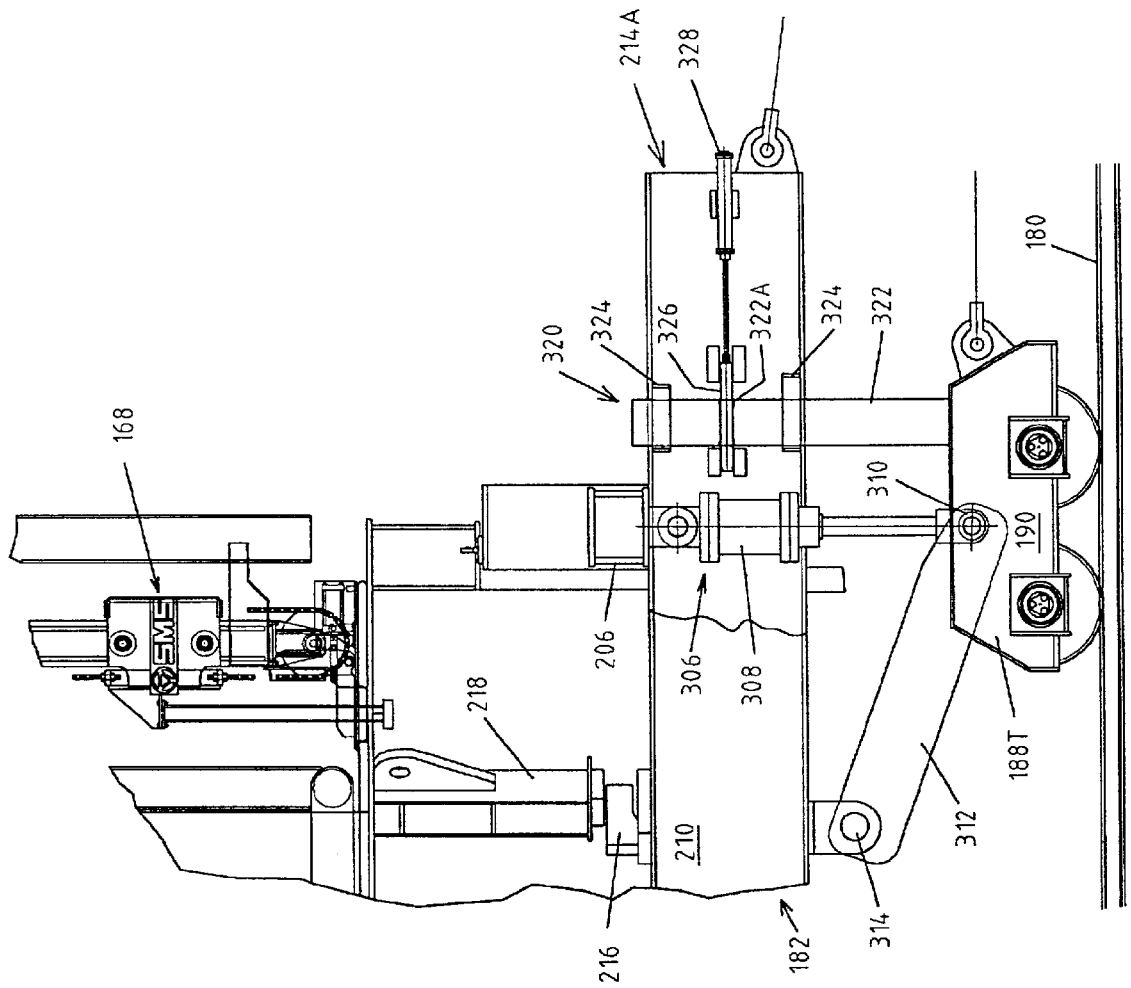
FIG. 15 is a an enlarged fragmentary illustration similar to the illustration of FIG. 12 to illustrate a second embodiment of the arrangement of parts for supporting an electric arc furnace during the refining of steel heat before tapping of a steel heat.
Figure 16:
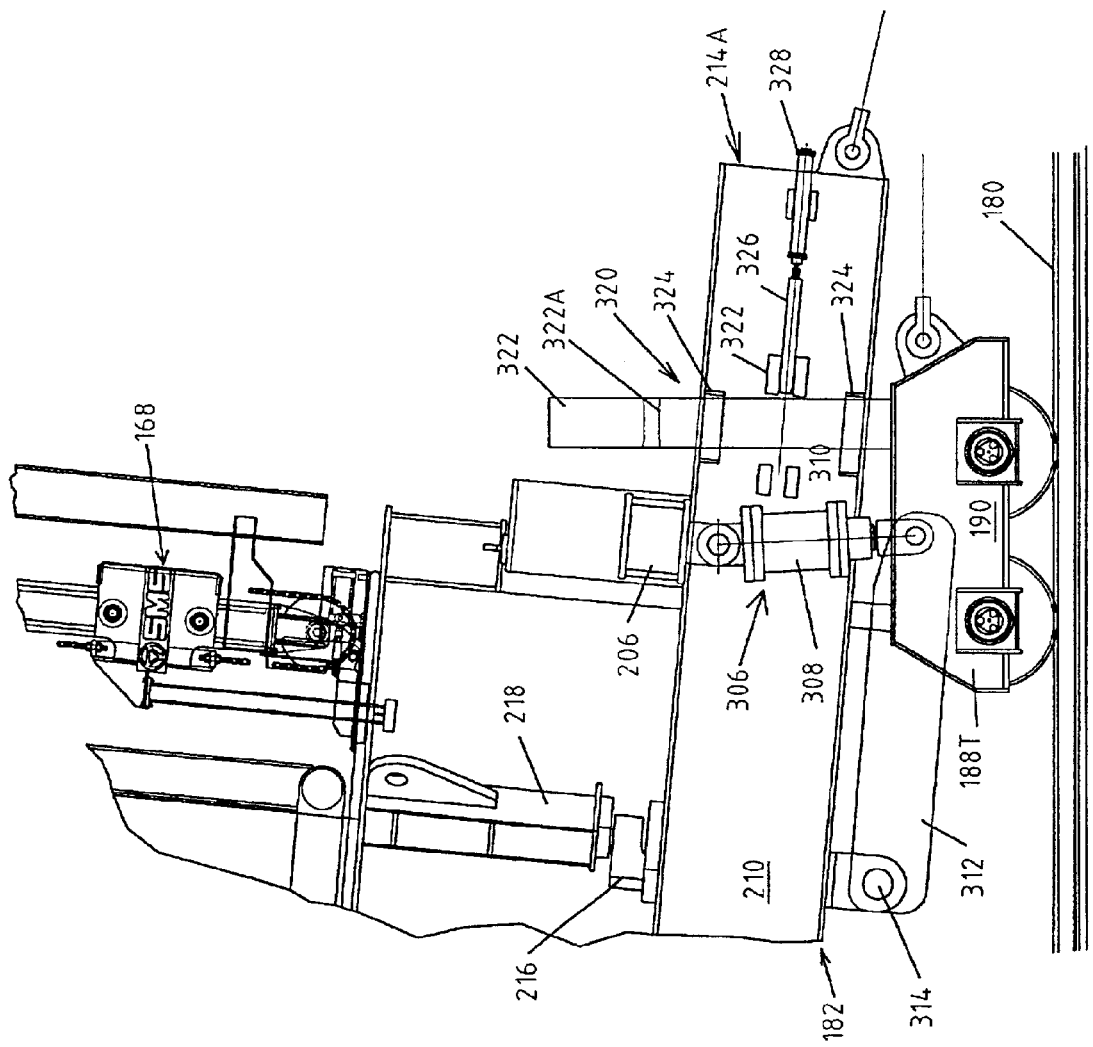
FIG. 16 is a view similar to FIG. 15 and illustrating the arrangement of parts of the second embodiment for tilting the electric arc furnace for tapping of a steel heat.

The second embodiment of the present invention provides that, if desired, the furnace is tilted in a direction, which is opposite to the direction for decanting of slag, for the tapping of a steel heat. For this purpose, as shown in FIGS. 14–16, the furnace support platform 214A is tilted to lower the support blocks 238A into supporting engagement with the trailing wheel assemblies 188T by operation of actuator support structures 306. This tilting of the lower furnace shell also tilts the superimposed furnace components supported thereby which essentially including the upper furnace shell and the furnace roof at the furnace operating site on the transfer car in a direction to increase the depth of liquid metal at the tap hole assembly 166 for tapping liquid steel from the lower furnace shell. The structures 306 include a piston and cylinder assembly 308 at each of the trailing wheel assemblies 188T, which are located at the opposite sides of the tap hole assembly 166 and at a side of the lower furnace shell opposite to the site of the deslagging passageway 154. Each of the piston cylinder and assemblies 308 has a rod end secured by a pivot shaft 310 to one of the wheel housings 190 of the trailing wheel assemblies 188T and to one end of a pivot control arm 312. The free end of the pivot control arm 312 is engaged with the furnace support platform 214A by a pivot shaft 314 mounted to clevis plates on the bottom surface of the overlying one of the side beams 210 and 212. The cylinder end of each of the piston and cylinder assemblies 308 is mounted by a clevis 316 to the cross beam 206.

The actuator support structure 306 further includes frame stabilizers 320 at each of opposite sides of the trailing end of the furnace. The frame stabilizers each include spaced apart guide bars 322 secured to the wheel housing 190 and extending upwardly through two vertically spaced guides 324 secured to each of opposite sides of the overlying one of the side beams 210 and 212. The actuator support structure 306 is actuated for lowering the furnace support platform 214A and thereby tilting the furnace from the normal operating position by lowering the end of the furnace containing the tap hole assembly relative to the deslagging passageway. After the tapping of a steel heat is completed, the furnace support platform 214A is returned to the normal operating position by operating the piston and cylinder assemblies 308 thereby lifting the end of the furnace containing the tap hole assembly relative to the deslagging passageway. Lock bars 326 on each of the side beams 210 and 212 are then linearly displaced by an associated one of piston and cylinder assemblies 328. The lock bars 326 are guided by load bearing retainer guides 330 and 332 at spaced locations along the guide bars. The lifting of the furnace to the normal operating position brings apertures 322A in the guide bars 322 into an aligned relation with the lock bars 326. The piston and cylinder assemblies 328 are then operated to displace the lock bars 326 beyond the retainer guides 330 through the apertures 322A and into locking engagement with the retainer guides 332. By this arrangement of the lock bar, the furnace remains in a mechanically locked and a stable operating position during the refining of steel independently of the operable functionality of the piston and cylinder assemblies 308.

Figure 17:
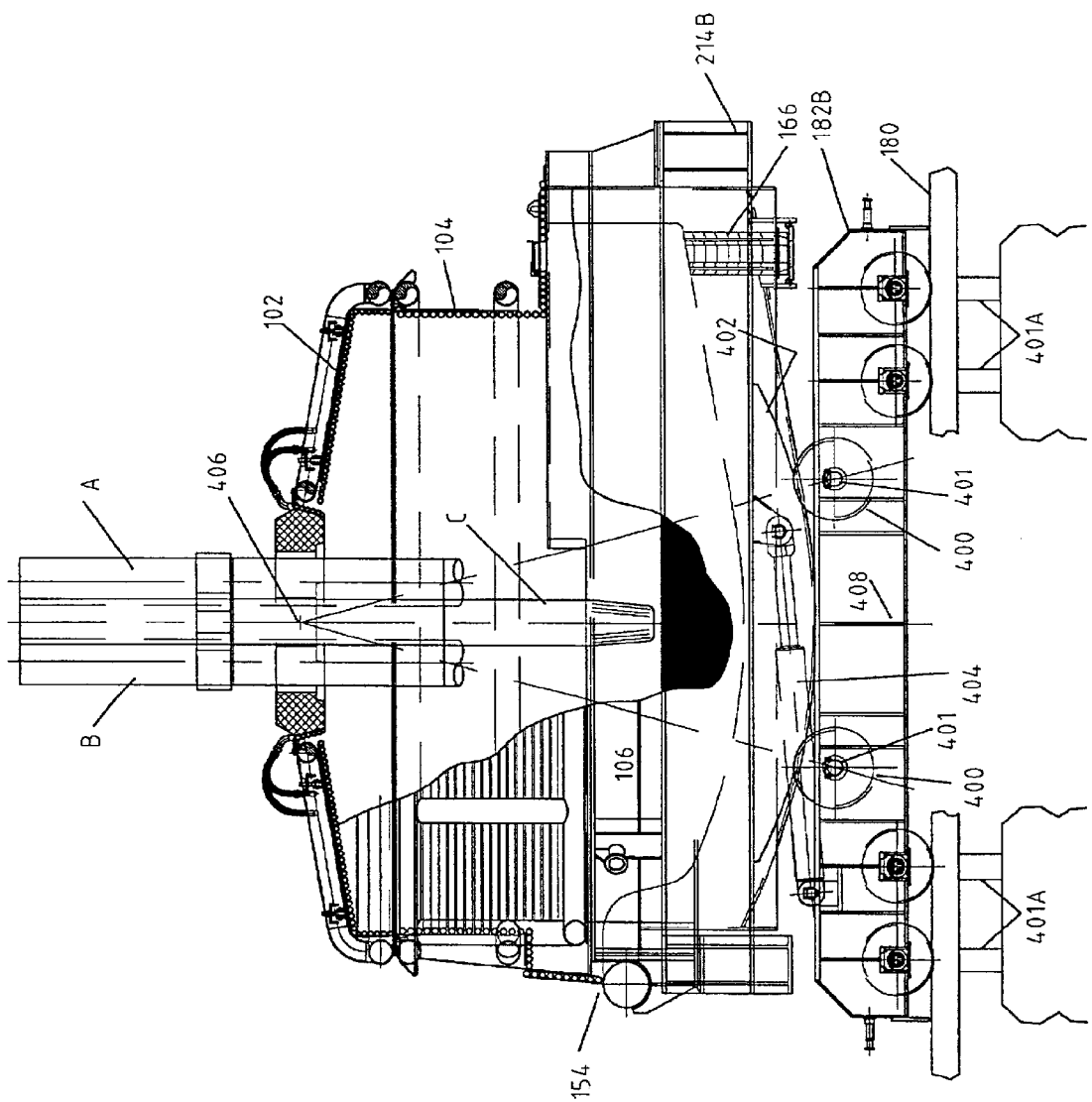
FIG. 17 is an enlarged fragmentary illustration of the operating position of the arrangement of parts according to a third embodiment of the present invention for supporting an electric arc furnace during the refining of steel heat.

FIG. 17 illustrates a third embodiment of the electric arc furnace, which essentially provides for the pivotal support of the lower furnace shell on a modified construction of the furnace car. For this purpose the furnace transfer car 182B is provided with pairs of forward and aft spaced apart rollers 400 rotatably supported by bearing assemblies each in load bearing contact with load cells 401, forming weight sensors, mounted on the furnace transfer car 182B. The load cells 401 provide electrical signals, which are processed by suitable electronic circuitry to provide an output signal representing the weight of a steel heat available for tapping. Alternative to the use of load cells 401 is an arrangement of load cells 401A at sites underlying the wheel sets of the furnace transfer car 182B and located between the bottom of the furnace car support rails 180A and the foundation structure for these rails. The load cells 401A are used to provide electrical signals processed by electronic circuitry to derive an electronic representation of the available steel heat for tapping. The furnace support platform 214B engaged with the lower furnace shell is provided with spaced apart arcuate bars 402 in load bearing contact with the rollers 400. The axes of rotation of the rollers 400 are contained in a horizontal plane that is parallel with a horizontal plane containing the rotational axes of the wheels of the furnace transfer car. The entire furnace is supported on the furnace car by the rollers 400 and can be tilted in opposite directions by operation of actuator support structure that include a piston cylinder assembly 404 mounted on the furnace transfer car 182B and its rod end clevis mounted to the furnace support platform 214B for the lower furnace shell 106. The geometry of the furnace is such that the furnace pivots about a point 406 centered in the aperture of the furnace roof 102, which contains the A, B, and C electrodes. A vertical plane 408 passing through the point 406 extends along the center of gravity of the furnace to there by always assure that the furnace will always return to a stable horizontal orientation in the event of a power failure in the operation of the piston and cylinder assembly 404. The construction of the furnace in all other respects will be the same as shown in FIGS. 1–3 and described hereinbefore, except that the bottom refractory profile is different and tapping is accomplished by using a standard bottom tapping tap gate design and not a stopper rod system.

Figure 18:
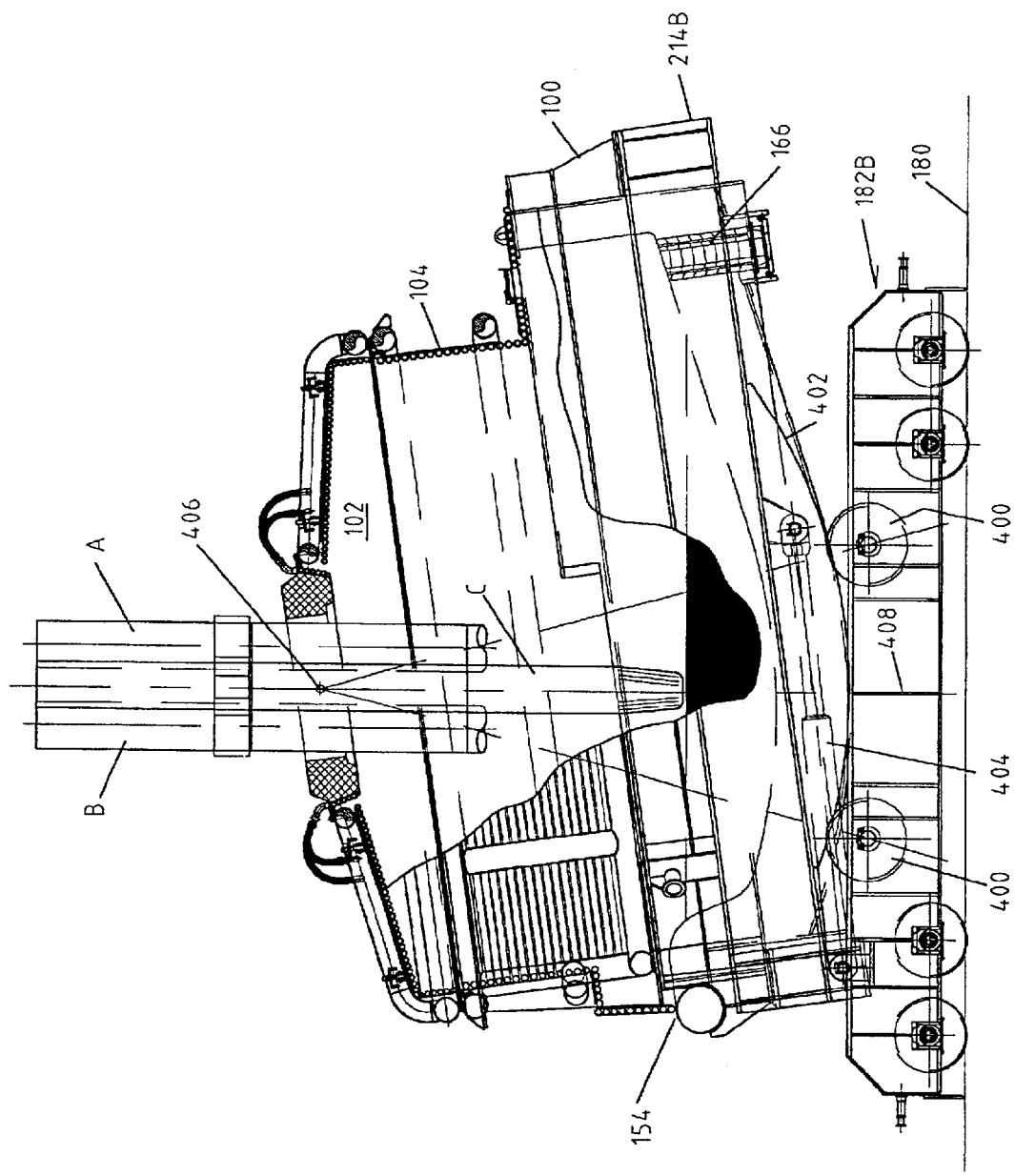
FIG. 18 is a view similar to FIG. 17 and illustrating the arrangement of parts of the third embodiment for tilting the electric arc furnace to decant slag.

FIG. 18 illustrates the tilted position of the furnace on the furnace support platform 214B after operation of the piston and cylinder assembly 404 to tilt the lower furnace shell and thus also the superimposed furnace components supported thereby which essentially comprise the upper furnace shell and the furnace roof at the furnace operating site on the transfer car in a direction to increase the depth of slag at the deslagging passageway 154 for decanting slag floating on liquid steel in the lower furnace shell. It is to be noted that the geometric relation providing that the furnace pivots about a point 406 centered in the aperture of the furnace roof 102, allows continued heating of the liquid steel in the furnace by operation of the A, B, and C electrodes during the decanting of slag. This continued operation of the electrodes serves to provide a higher temperature of the steel heat during tapping of the heat.

Figure 19:
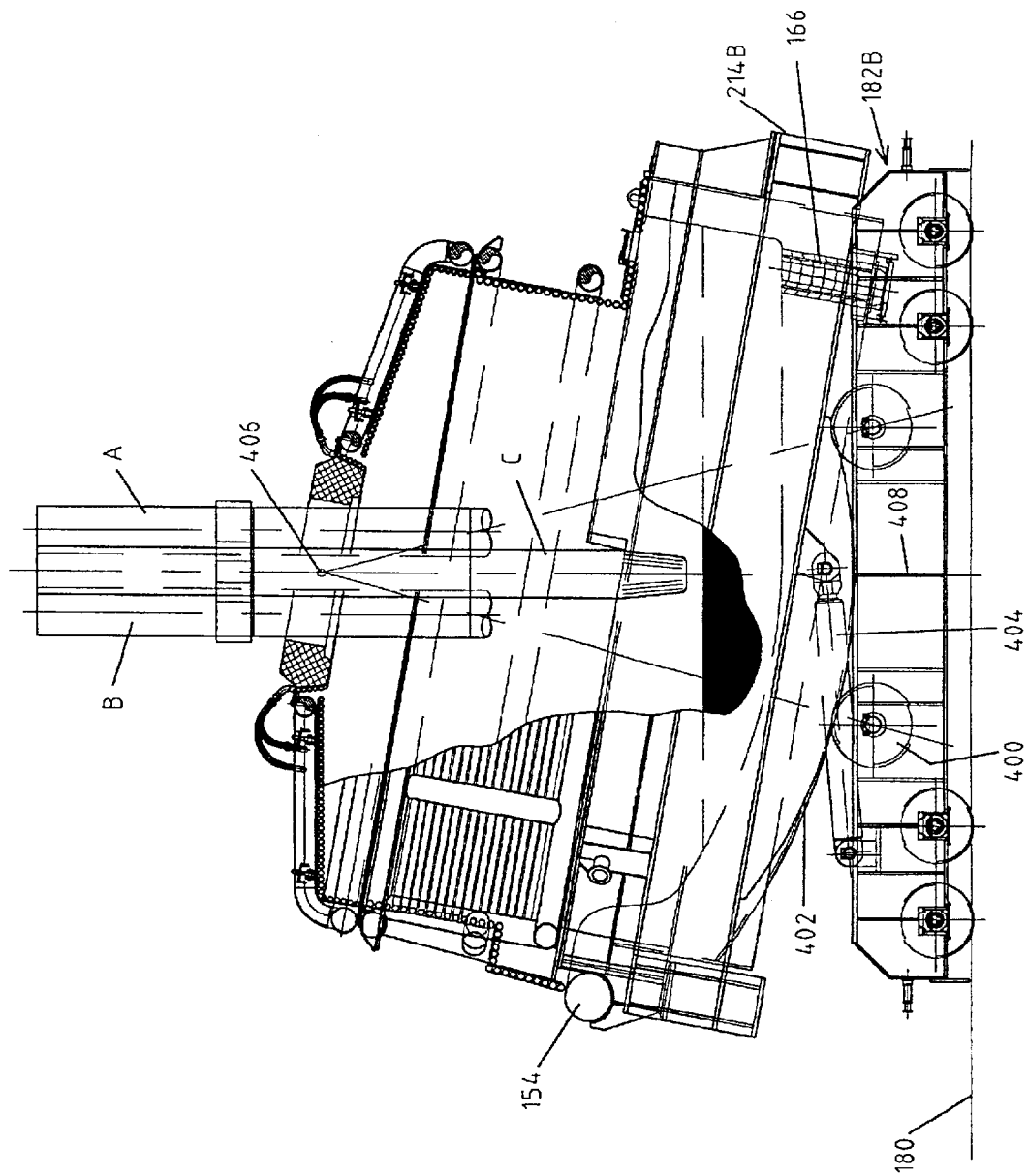
FIG. 19 is a view similar to FIG. 17 and illustrating the arrangement of parts of the third embodiment for tilting the electric arc furnace for tapping of a steel heat.

FIG. 19 illustrates the tilted position of the furnace on the furnace support platform 214B after operation of the piston and cylinder assembly 404 to tilt the lower furnace shell and thus also the superimposed furnace components supported thereby in a direction to increase the depth of liquid steel at the tap hole assembly 166 for tapping of liquid steel from the lower furnace shell. It is to be noted also that the geometric relation providing that the furnace pivots about a point 406 centered in the aperture of the furnace roof 102, allows continued heating of the liquid steel in the furnace by operation of the A, B, and C electrodes during the tapping of liquid steel. This continued operation of the electrodes also serves to provide a higher temperature of the steel heat during tapping. The construction of the furnace in all other respects will be the same as shown in FIGS. 1–3 and described hereinbefore, except that tapping of the electric arc furnace is by a standard bottom tapping tap gate designed not a stopper rod. After the furnace is tapped, the furnace is tilted to raise the tap hole elevation clearing it of slag or steel so that the gate at the bottom of the hole can be closed and the hole can be filled with a sand-like material, commonly called sanding the tap hole. However, the present invention is equally applicable to other well-known forms of steel making furnaces. For example, arc-heating furnaces used to heat a metal charge by heat radiation from arcs passed between electrodes above the metal charge. Other furnace designs include an electrically conductive furnace bottom which forms part of an electrical circuit powered by direct current. Induction furnaces can also be installed which operate to heat a metal charge by either using inductors according to a transformer principle where the secondary winding is formed by a loop of liquid metal in a refractory channel or a coreless principle where induction coils surround the furnace wall and generates a magnetic field to impart energy to the metal charge in the furnace.

While the present invention has been described in connection with the preferred embodiments of the various figures, it is to be understood that other similar embodiments may be used or modifications and additions may be made to the described embodiment for performing the same function of the present invention without deviating there from.

Therefore, the present invention should not be limited to any single embodiment, but rather construed in breadth and scope in accordance with the recitation of the appended claims.

What is claimed is:

1. An electric steel-making furnace including the combination of:
   a furnace roof carried by an upper furnace shell on a lower furnace shell to substantially envelop an atmosphere above liquid steel and slag floating thereon in said lower furnace shell, said lower furnace shell having a refractory lining with a deslagging passageway in a sidewall thereof:
   a transfer car supporting said lower furnace shell for transport from a furnace operating site to a remote exchange site for exchanging one or more of said furnace roof, said upper furnace shell and said lower furnace shell, said transfer car further includes a furnace support frame supported by wheel assemblies; and
   support including an actuator to tilt said lower furnace shell at said furnace operating site about two fixedly spaced axes on said transfer car in a direction to increase the depth of slag at said deslagging passageway for decanting slag floating on liquid steel in said lower furnace shell, and wherein said actuator includes spaced apart link arms defining said fixedly spaced axes on said transfer car to pivotally interconnect said furnace support frame with said wheel assemblies and wherein said transfer car further includes a drive to control pivotal displacement of said furnace support frame about said link arms.

2. The electric steel-making furnace according to claim 1 wherein said transfer car further includes frame stabilizers operatively interconnecting said furnace support frame and said wheel assemblies.

3. The electric steel-making furnace according to claim 2 wherein said frame stabilizers include a guide bar secured to said wheel assemblies and a guide supported by said furnace support frame for slidably receiving said guide bar.

4. The electric steel-making furnace according to claim 3 wherein said guide comprises guide plates spaced vertically on said furnace support frame.

5. The electric steel-making furnace according to claim 4 wherein said spaced apart link arms extend along opposite sides of said furnace support frame at a non slagging end thereof which is opposite to an end containing said deslagging passageway in said lower furnace shell for pivoting said lower furnace shell by operation of said actuator in a direction which elevates said non slagging end relative to said wheel assemblies to decant slag floating on said liquid steel.

6. The electric steel-making furnace according to claim 5 wherein said actuator comprises a piston and cylinder assembly for each of said link arms, each piston cylinder and assembly having a rod end secured to one of said wheel assembly and said furnace support frame and a cylinder end secured to the other end of said wheel assembly and said furnace support frame, each of said piston and cylinder assembly having the rod end extendable from the cylinder end to pivot said lower furnace shell from a horizontal orientation for refining liquid steel therein to an angled position to the horizontal to decant slag floating on said liquid steel.

7. The electric steel-making furnace according to claim 4 wherein said spaced apart link arms extend along opposite sides of said furnace support frame at an end thereof containing said deslagging passageway in said lower furnace shell for pivoting said lower furnace shell by operation of said actuator in a direction which lowers said deslagging passageway toward said wheel assemblies to decant slag floating on said liquid steel.

8. The electric steel-making furnace according to claim 7 wherein said actuator comprises a piston and cylinder assembly for each of said link arms, each piston cylinder and assembly having a rod end secured to one of said wheel assembly and said furnace support frame and a cylinder end secured to the other end of said wheel assembly and said furnace support frame, each of said piston and cylinder assembly having the rod end extended from the cylinder end to establish a horizontal orientation of said lower furnace shell for refining liquid steel therein, a lock having an operative position preventing tilting of said lower furnace shell by said transfer car, and a lock actuator for displacing said lock into an inoperative position from said operative position to allow tilting of said lower furnace shell.

9. The electric steel-making furnace according to claim 8 wherein said lock comprises an elongated lock bar slidably supported between spaced apart guides.

10. The electric steel-making furnace according to claim 9 wherein said spared apart guides are supported by said furnace support frame at opposite lateral sides of each of said frame stabilizers, said frame stabilizers having apertures aligned with guide ways of said pair of guides for establishing interlocking engagement by a resident of said elongated lock in said apertures and said pair of guides.

11. The electric steel-making furnace according to claim 1 wherein said lower said furnace shell includes a tap hole in said refractory lining at a side thereof opposite to the site of said deslagging passageway, said spaced apart link arms extend along opposite sides of said furnace support frame at each of the ends thereof containing said tap hole and said deslagging passageway for tilting said lower furnace shell in opposite directions one direction for slag decanting and one direction for tapping a heat of liquid steel.

12. The electric steel-making furnace according to claim 1 wherein said lower said furnace shell includes a tap hole in said refractory lining at a side thereof opposite to the site of said deslagging passageway, said link arms extend along opposite sides of said furnace frame at each of the ends thereof containing said deslagging passageway and said tap hole and wherein said actuator tilts said furnace support frame at different times for lowering said deslagging passageway toward said wheel assembly for slag decanting and for lowering said tap hole toward said wheel assemblies for tapping a heat of liquid steel.

13. The electric steel-making furnace according to claim 11 wherein said actuator includes actuators at the opposite ends of said furnace support frame where said deslagging passageway and said tap hole reside, said actuators extending between said furnace support frame and wheel assemblies for raising said tap hole relative to said wheel assemblies for decanting slag from said deslagging passageway and at other times for raising said deslagging passageway relative to said wheel assemblies for tapping a heat of liquid steel.

14. An electric steel-making furnace including the combination of:
   a furnace roof carried by an upper furnace shell on a lower furnace shell to substantially envelop an atmosphere above liquid steel and slag floating thereon in said lower furnace shell, said lower furnace shell having a refractory lining with a deslagging passageway in a sidewall thereof:
   a transfer car supporting said lower furnace shell for transport from a furnace operating site to a remote exchange site for exchanging one or more of said furnace roof, said upper furnace shell and said lower furnace shell, said transfer car including a wheeled carriage supporting a furnace support frame for tilting movement of the furnace support frame in a direction to alter the elevation of said deslagging passageway relative to said wheel carriage, said transfer car further including spaced apart rocker rails secured to said furnace support frame and engaged with spaced apart support rollers rotatably about two fixedly spaced axes mounted on said wheeled carriage; and a support including an actuator to tilt said lower furnace shell at said furnace operating site on said transfer car in a direction to increase the depth of slag at said deslagging passageway for decanting slag floating on liquid steel in said lower furnace shell.

15. The electric steel-making furnace according to claim 14 wherein said actuator includes a piston and cylinder assembly interconnecting said wheeled carriage and said furnace support frame.

16. The electric steel-making furnace according to claim 14 wherein said transfer car further includes weighing sensors responsive to a load imposed by said furnace support frame along said spaced apart rollers for deriving an electronic signal responsive to the weight of the liquid steel in said furnace.

17. The electric steel-making furnace according to claim 14 further including rails supporting said transfer car for movement between said furnace operating site and said exchange site, a drive for linearly displacing said furnace transfer car alone said rails between the furnace operating position and the furnace exchange position; and an anchor to secure said furnace transfer car at said furnace operating position.

18. The electric steel-making furnace according to claim 17 further including weighing sensors responsive to a load imposed by said furnace support frame along said rails for deriving an electronic signal responsive to the weight of the liquid steel in said furnace.

19. A method for producing steel in an electric furnace, said method of including the steps of:

providing an electric furnace including a transfer car supporting a lower furnace shell having a sidewall containing a deslagging passageway at an end of a floor wall opposite to a tap hole;

refining consecutively steel heats in said electric furnace while residing on said transfer car at a furnace operating site for the furnace;

decanting slag floating on consecutively refined steel heats by using said transfer car at said furnace operating site to tilt said lower furnace shell about two fixedly spaced axes on said transfer car in a direction to increase the slag depth at said deslagging passageway;

tapping liquid steel from consecutive steel heats after decanting slag there from by using said transfer car at said furnace operating site to tilt said lower furnace shell about fixedly spaced axes on said transfer car in a direction to increase the liquid steel depth at said tap hole;

transporting said lower furnace shell on said transfer car from said furnace operating site to a remote lower furnace exchange site;

introducing a replacement lower furnace shell on said transfer car at said lower furnace exchange site;

using said transfer car to transport said replacement lower furnace shell to said furnace operating site; and thereafter repeating said steps of refining, decanting, and tapping.

20. The method according to claim 19 wherein said step of decanting slag includes tilting said lower furnace shell to increase the slag depth at said deslagging passageway.

21. The method according to claim 20 wherein said tilting said lower furnace shell to increase the slag depth consists of lowering said furnace shell at said deslagging passageway.

22. The method according to claim 20 wherein said tilting said lower furnace shell to increase the slag depth consists of raising said furnace shell at said tap hole.

23. The method according to claim 19 wherein said step of tapping liquid steel includes tilting said lower furnace shell to increase the liquid steel depth at said tap hole.

24. The method according to claim 23 wherein said tilting said lower furnace shell to increase the liquid steel depth consists of lowering said furnace shell at said tap hole.

25. The method according to claim 23 wherein said tilting said lower furnace shell to increase the liquid steel depth consists of raising said furnace shell at said deslagging passageway.

26. The method according to claim 19 wherein said step of decanting slag includes rocking said lower furnace shell about a radius extending from a central axis of said lower furnace shell to increase the slag depth at said deslagging passageway.

27. The method according to claim 26 wherein said step of said step of tapping liquid steel includes rocking said lower furnace shell about a radius extending from a central axis of said lower furnace shell to increase the liquid steel depth at said tap hole.

* * * * *